United States Patent
Murphy

(10) Patent No.: US 10,698,849 B2
(45) Date of Patent: Jun. 30, 2020

(54) METHODS AND APPARATUS FOR AUGMENTED BUS NUMBERING

(71) Applicant: Apple Inc., Cupertino, CA (US)

(72) Inventor: Michael Murphy, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 183 days.

(21) Appl. No.: 14/710,433

(22) Filed: May 12, 2015

(65) Prior Publication Data
US 2016/0267035 A1 Sep. 15, 2016

Related U.S. Application Data

(60) Provisional application No. 62/131,736, filed on Mar. 11, 2015.

(51) Int. Cl.
*G06F 13/368* (2006.01)
*G06F 13/40* (2006.01)
*G06F 13/42* (2006.01)

(52) U.S. Cl.
CPC ........ *G06F 13/368* (2013.01); *G06F 13/4027* (2013.01); *G06F 13/4068* (2013.01); *G06F 13/4282* (2013.01)

(58) Field of Classification Search
CPC .............. G06F 13/368; G06F 13/4027; G06F 13/4068; G06F 13/4282
See application file for complete search history.

(56) References Cited

U.S. PATENT DOCUMENTS

| 5,761,448 A * | 6/1998 | Adamson .............. G06F 13/423 710/104 |
| 2006/0206655 A1* | 9/2006 | Chappell ............. G06F 13/4027 710/315 |
| 2006/0282603 A1* | 12/2006 | Onufryk ............... G06F 13/404 710/312 |
| 2009/0164694 A1* | 6/2009 | Talayco .............. G06F 13/4022 710/316 |
| 2009/0296740 A1* | 12/2009 | Wagh ...................... H04L 69/22 370/475 |
| 2010/0036995 A1* | 2/2010 | Nakayama .......... G06F 13/4022 710/316 |

(Continued)

OTHER PUBLICATIONS

PCI Express Base Specification Revision 3.0 (PCI Express Base Specification, PCISIG, Nov. 10, 2010; hereinafter "PCIExpress")(Year: 2010).*

*Primary Examiner* — Tim T Vo
*Assistant Examiner* — Herve Iradukunda
(74) *Attorney, Agent, or Firm* — Gazdzinski & Associates, PC

(57) ABSTRACT

Methods and apparatus for augmenting routing resources. In one exemplary embodiment, a Thunderbolt™ transceiver incorporates a Peripheral Component Interconnect Express (PCIe) bus that supports hot-plugging and hot-unplugging of peripheral devices. Unfortunately, for various backward compatibility reasons, existing PCIe bus enumeration protocols can quickly exhaust the PCIe routing resources (for example, PCIe bus numbers) resulting in undesirable consequences (for example, crashes, dead connections, etc.) The present disclosure describes schemes for augmenting the pool of PCIe bus numbers and dynamically re-assigning PCIe bus numbers, so as to eliminate the aforementioned concerns.

19 Claims, 26 Drawing Sheets

(56) References Cited

U.S. PATENT DOCUMENTS

| | | | |
|---|---|---|---|
| 2012/0036306 A1* | 2/2012 | Miyoshi | G06F 13/102 710/316 |
| 2012/0166699 A1* | 6/2012 | Kumar | G06F 13/385 710/306 |
| 2014/0237156 A1* | 8/2014 | Regula | G06F 21/85 710/314 |
| 2015/0006780 A1* | 1/2015 | Shao | G06F 13/4022 710/316 |

* cited by examiner

| | 0 | 2 | 10 | 16 | 15 | 20 | 26 | 31 | |
|---|---|---|---|---|---|---|---|---|---|
| | PCIe Extended Capability ID | | | Cap Ver | VSEC Rev | Nxt Capability Offset | | | DWord 0 |
| | VSEC ID | | | | | VSEC Length | | | DWord 1 |
| | 1610 | | | 1602 | | ABN Primary Bus # | | | DWord 2 |
| | ABN Secondary Bus # | | 1604 | | | ABN Subordinate Bus # | | 1606 | DWord 3 |
| | ABN Bus # Base 0 | | 1608A | | | ABN Bus # Limit 0 | | 1608B | DWord 4 |
| | ABN Bus # Base 1 | | 1608A | | | ABN Bus # Limit 1 | | 1608B | DWord 5 |
| | ABN Bus # Base 2 | | 1608A | | | ABN Bus # Limit 2 | | 1608B | DWord 6 |
| | ABN Bus # Base 3 | | 1608A | | | ABN Bus # Limit 3 | | 1608B | DWord 7 |

| | Next Capability Offset | Cap ver | PCIe Extended Capability ID | DWord 0x00 |
|---|---|---|---|---|
| | VSEC Length | VSEC Rev | VSEC ID | DWord 0x01 |
| | Lower Address Base 0 | | Upper Address Base 0 | DWord 0x02 |
| | | | Upper Address Base 0 | DWord 0x03 |
| | Lower Address Limit 0 | | Upper Address Limit 0 | DWord 0x04 |
| | | | Upper Address Limit 0 | DWord 0x05 |
| | Lower Address Base 1 | | Upper Address Base 1 | DWord 0x06 |
| | | | Upper Address Base 1 | DWord 0x07 |
| | Lower Address Limit 1 | | Upper Address Limit 1 | DWord 0x08 |
| | | | Upper Address Limit 1 | DWord 0x09 |
| | Lower Address Base 2 | | Upper Address Base 2 | DWord 0x0A |
| | | | Upper Address Base 2 | DWord 0x0B |
| | Lower Address Limit 2 | | Upper Address Limit 2 | DWord 0x0C |
| | | | Upper Address Limit 2 | DWord 0x0D |
| | Lower Address Base 3 | | Upper Address Base 3 | DWord 0x0E |
| | | | Upper Address Base 3 | DWord 0x0F |
| | Lower Address Limit 3 | | Upper Address Limit 3 | DWord 0x10 |
| | | | Upper Address Limit 3 | DWord 0x11 |

FIG. 17

METHODS AND APPARATUS FOR AUGMENTED BUS NUMBERING

PRIORITY

This application claims priority to U.S. Provisional Patent Application Ser. No. 62/131,736 filed Mar. 11, 2015 entitled "METHODS AND APPARATUS FOR AUGMENTED BUS NUMBERING", the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The disclosure relates generally to the field of high speed serial buses, as well as bus enumeration and network management thereof. More particularly, in one exemplary aspect, the disclosure is directed to methods and apparatus for augmenting routing resources of a PCI/PCIe based network technology. Various aspects of the present disclosure are directed to efficient management of bus enumeration during bus configuration processes.

2. Description of Related Technology

Peripheral Component Interconnect Express (PCIe), is a high-speed serial computer expansion bus technology that has very high adoption rates by computer and consumer electronics manufacturers. In fact, PCIe has become the de facto standard for adding additional input/output (I/O) capability beyond the functionality offered by a computer system base chipset. For example, the Thunderbolt™ connectivity ecosystem, couples a PCIe link (for high-speed peripheral device access) with a DisplayPort™ link (for high-speed display data capabilities).

Conceptually, PCIe was based on the older PCI expansion bus technology developed in 1993. At that time, the goal of PCI was to provide a standard method of adding hardware units to a computer bus. Each hardware unit was connected to a shared parallel bus, using a mechanism to identify each hardware unit as a unique device of the shared bus. Each device was further logically subdivided into up to eight functions. Thus, originally the PCI bus could support several devices, each with several functions. With the advent of PCIe, the physically shared parallel bus was replaced with a peer-to-peer high-speed serial bus. By removing the shared parallel bus, PCIe enabled support for full-duplex communication between any two endpoints, with no inherent limitation on concurrent access across multiple endpoints.

Even though the legacy PCI hardware architecture did not directly translate to PCIe hardware, PCIe prioritized software compatibility with the PCI software architecture. For reasons described in greater detail herein, this imperfect translation introduced certain hardware limitations which greatly complicated and/or prevented the implementation of certain desirable bus capabilities. For example, incipient research into improved technologies which incorporate PCIe (such as the aforementioned Thunderbolt application) encounter hard limitations for use scenarios which are reconfigured during operation (e.g., hot-swapping, hot-plugging, etc.)

Ideally, improved methods and apparatus are needed to support dynamic changes to network topologies for PCIe based architectures. More generally, various solutions are needed for augmenting existing schemes for bus numbering and/or device identification.

SUMMARY

The present disclosure satisfies the foregoing by providing, inter alia, methods and apparatus for augmenting routing resources.

A method for augmenting routing resources at a bridge device is disclosed. In one embodiment, the method includes: recognizing a default bus type transaction based on a default bus type identifier; responsive to an attachment of one or more subordinate buses, assigning one or more subordinate bus type identifiers; and for each subsequent transaction that is identified with a destination subordinate bus type identifier, forwarding the subsequent transaction to the corresponding subordinate bus; wherein a secondary device attached to the subordinate bus is configured to convert the subsequent transaction that is identified with a destination subordinate bus type identifier to a default bus transaction for the secondary device.

In one variant, the default bus type transactions are Peripheral Component Interconnect Express (PCIe) transactions, and the default bus type identifier comprises a triplet that comprises a bus number, a device number, and a function number.

In another variant, the subordinate bus type transactions comprise a destination subordinate bus type identifier, and a destination node identifier.

In still other variants, for each subsequent transaction that is identified with a destination subordinate bus type identifier that matches a subordinate bus identifier associated with a target device below the bridge device, converting the transaction to a default bus transaction for the target device.

In another variant, at least a portion of each subsequent transaction are non-posted transactions. In one such variant, for each non-posted transaction received from another device: recording an original request identifier and assigning a unique tag value to the transaction; responsive to receiving a completion identified with the unique tag value, replacing the unique tag value with the original request identifier; and forwarding the completion to the another device.

In one case, the bridge device is a top bridge of an augmented bus capable network.

In still other implementations, the bridge device is a node of an augmented bus capable network.

In another implementation, the attachment of one or more subordinate buses comprises a hot plug event.

A bridging apparatus configured to augment routing resources is disclosed. In one embodiment, the apparatus includes: an upstream interface; one or more downstream interfaces; logic configured to recognize a default bus type transaction based on a default bus type identifier; logic configured to responsive to an attachment of one or more subordinate buses, assign one or more subordinate bus type identifiers; and logic configured to, for each subsequent transaction that is identified with a destination subordinate bus type identifier, forward the subsequent transaction to the corresponding subordinate bus.

In one variant, the bridging apparatus includes logic configured to, responsive to receiving a transaction that is identified with a destination subordinate bus type identifier that matches a subordinate bus identifier associated with a target device below the bridge device, convert the transaction to a default bus transaction. In one such variant, the default bus type transactions are selected from the group comprising default type 0 transactions and default type 1 transactions. In another such variant, the forwarded subsequent transaction comprises an augmented bus type transaction. In one such case, the augmented bus type transactions are selected from the group comprising augmented type 0 transactions and augmented type 1 transactions. In one such case, the apparatus includes logic configured to, for subsequent transactions that correspond to a target bridging apparatus below the bridging apparatus, convert the subsequent transactions to an augmented type 0 transaction.

In some variants, the bridging apparatus comprises a node coupled to a plurality of endpoint devices. In other variants, the bridging apparatus comprises a top bridge coupled to a plurality of augmented bridge devices.

A top bridge apparatus configured to augment routing resources is disclosed. In one embodiment, the top bridge includes: an upstream interface configured to communicate via a Peripheral Component Interconnect Express (PCIe) protocol; one or more downstream interfaces configured to communicate via an augmented bus number (ABN) protocol; logic configured to receive a PCIe memory access from a root complex; logic configured to responsively generate an ABN configuration type 1 transaction packet which comprises a PCIe End-End prefix comprising at least an ABN value and a PCIe configuration transaction; and logic configured to route the ABN configuration type 1 transaction packet via an ABN fabric to a target specified by the ABN value.

In one such case, the ABN value further comprises an ABN bus value, and a node identifier.

In another such case, a bridge of the ABN fabric is further configured to convert the ABN configuration type 1 transaction packet to an ABN configuration type 0 transaction packet when the ABN bus value matches an ABN secondary bus number of the bridge and the bridge is not a node bridge. In one case, a node bridge of the ABN fabric is further configured to convert the ABN configuration type 1 transaction packet to a PCIe configuration type 1 transaction packet. In one case, a node bridge of the ABN fabric is further configured to convert the PCIe configuration type 1 transaction packet to a PCIe configuration type 0 transaction packet when a PCIe bus value is zero (0).

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 16 is a logical block diagram representation of a first exemplary data structure configured to store bridge routing resource allocations.

FIG. 17 is a logical block diagram representation of a second exemplary data structure configured to store bridge routing resource allocations.

All Figures © Copyright 2014-2015 Apple Inc. All rights reserved.

DETAILED DESCRIPTION OF EXEMPLARY EMBODIMENTS

Reference is now made to the drawings, wherein like numerals refer to like parts throughout.

As previously noted, Peripheral Connect Interface Express (PCIe) is based on the legacy Peripheral Connect Interface (PCI) software architectures. As used herein, the term PCI refers to the family of related standards which are derived from PCI, that include, without limitation, PCIe, PCI-eXtended (PCI-X), etc. More generally, as used herein, "legacy" refers to any precedent computer technology which is not configured to augment routing resources as described hereinafter.

As described within the PCI Express Base Specification Revision 3.1, published Nov. 7, 2013, incorporated herein by reference in its entirety, a so-called "device" refers to a physical or logical entity that supports one or more "functions". Within the context of the PCI software architecture, a so-called "function" generally refers to a uniquely addressable software entity having a corresponding "configuration space" within a device. PCI devices may support one or more functions; for example, extant PCIe devices may support up to eight functions having eight corresponding configuration spaces. Finally, in the context of PCI software architectures, a so-called "bridge" is a function that virtually or actually connects two or more PCI buses together.

Figure 1:
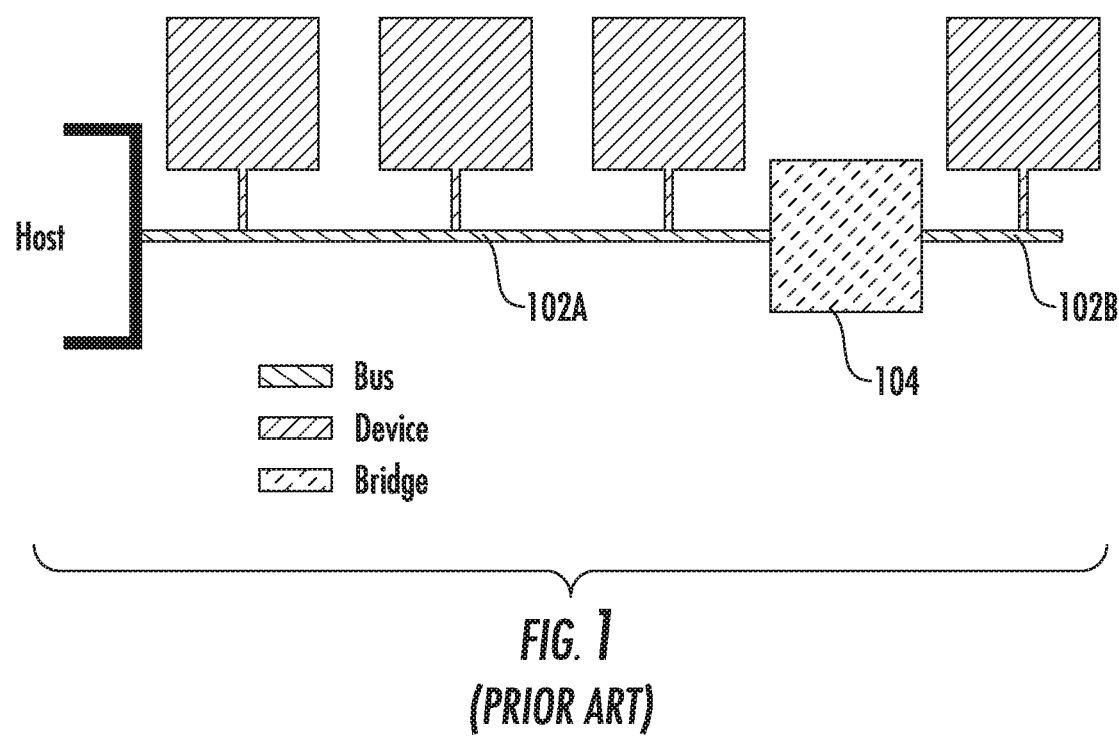
FIG. 1 is a logical block diagram representation of one prior art Peripheral Component Interconnect (PCI) bus architecture.

FIG. 1 illustrates one legacy PCI bus architecture configured to support four devices via two buses (102A, 102B) that are connected via a bridge component 104. As a brief aside, unlike most other memory architectures, PCI based software includes a "configuration space" mechanism. PCI devices have memory-mapped and I/O port spaces, but additionally each device function on the bus has a dedicated configuration space. The size of the configuration space may range from 256 bytes to 4096 bytes that are addressable (via special configuration cycle transactions) by concatenating the bus, device, and function numbers together to create a so-called "triplet" that uniquely identifies each function. The governing standards body for PCI (i.e., the PCI Special Interest Group (PCI-SIG)) has defined the number of bits for each one of these fields (i.e., Bus Number Field Length: 8 bits, Device Number Field Length: 5 bits, Function Number Field Length: 3 bits). With the sizes of the different fields defined, artisans of ordinary skill in the related arts will readily appreciate that a maximum of up to 8,192 devices (256 buses×32 devices) could exist in one topology. With 8,192 devices, a maximum of up to 65,536 functions could exist. Each PCI device must implement at least function number zero. The first 64 bytes of configuration space are standardized; the remainder is available for other PCI-defined or vendor-defined/proprietary purposes.

With the advent of PCIe, the PCI-SIG strived to maintain software compatibility with legacy PCI. Unfortunately, while maintaining software compatibility was a priority for PCIe, hardware compatibility was not. For example, unlike PCI which is based on a shared parallel bus; PCIe was configured to use a high-speed serial link for peer-to-peer links. In effect, PCIe eliminates multiple devices on a single bus. Recall that in the original PCI software architecture protocol, a PCI bus could support several devices, each with several functions; however, PCIe is a peer-to-peer interconnect between devices where only two devices are ever connected together. Consequently, each PCIe bus number directly corresponds to exactly one PCIe device number. While the general PCIe usage uses the term "bus number" and "device number" to describe bus routing resources, within the context of the present disclosure, the term "bus/device number" is used to more clearly represent the intertwined relationship between bus numbers, device numbers, and devices. More directly, within the context of typical PCIe operation without switches, the number of supported devices is limited by the available bus/device numbers; thus, there can only be 256 bus/device numbers.

PCIe also introduced a so-called "switch" hardware element for fanning out the PCIe topology. Since each device must be connected to the PCIe fabric by a unique bus, a switch is configured to add additional buses to a PCI network topology by "fanning out" the bus via an internal bus. Within this context, a switch is logically represented by an upward facing bridge connected to an internal bus that is connected to a set of downward facing bridges. Each downward facing bridge has a distinct device number on the switch's internal bus; in other words, the internal structure of the PCIe switch hardware element enables distinct device numbers.

Figure 2:
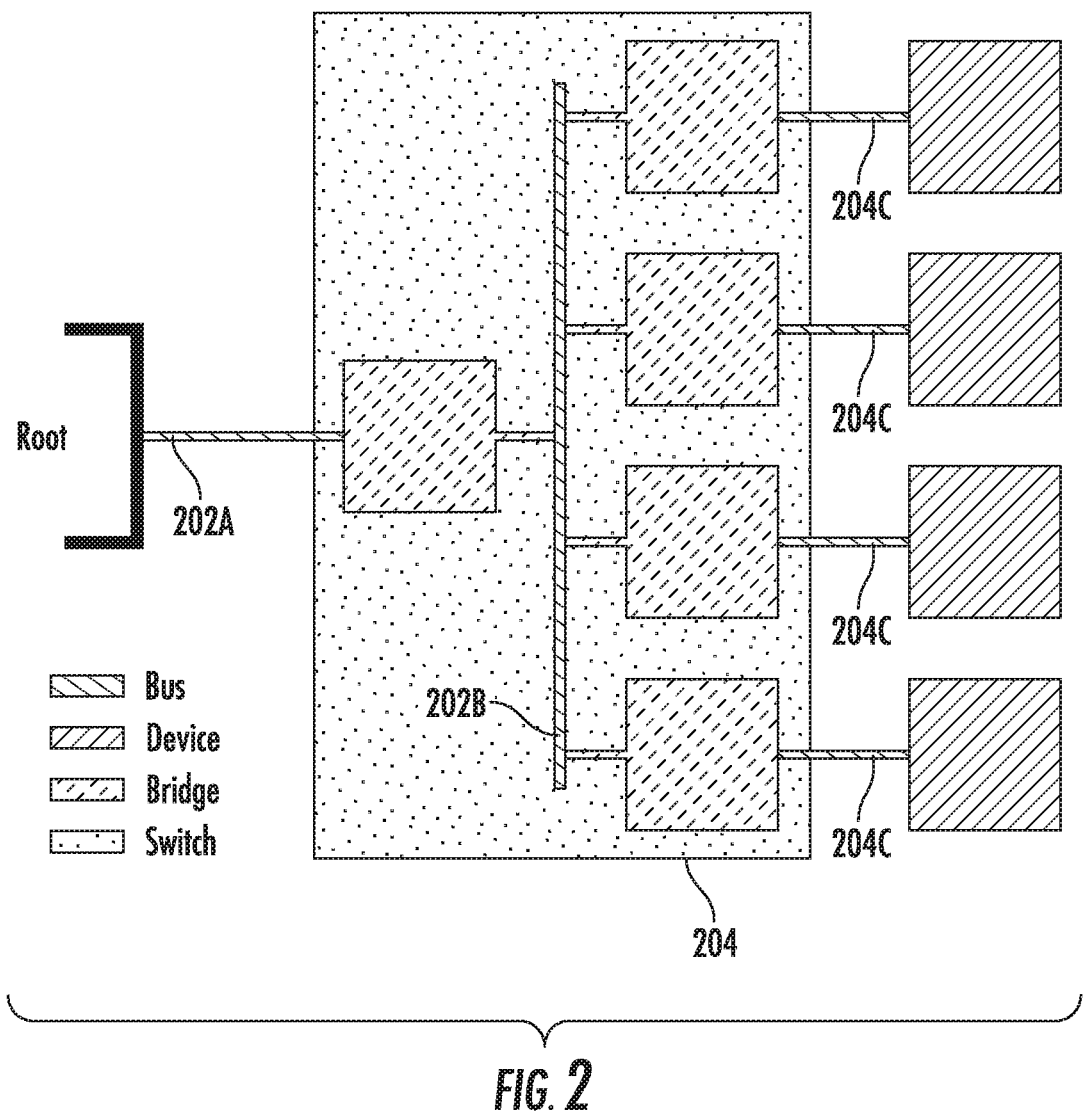
FIG. 2 is a logical block diagram representation of one Peripheral Component Interconnect Express (PCIe) bus architecture.

The combined limitations of PCIe bus/device numbering and switch hardware may rapidly consume the limited pool of bus/device numbers. FIG. 2 illustrates one PCIe bus architecture configured to support four devices via a 4-way switch component. Unlike the legacy bus architecture of FIG. 1, instead of having two distinct buses (i.e., two distinct bus numbers each having a number of device numbers), the PCIe bus architecture consumes nine bus/device numbers: (i) one bus/device number for the bridge attached to the bus 202A between the root complex and the switch 204; (ii) one bus/device number for each bridge attached to the internal bus 202B of the switch 204 (four in total); and (iii) a bus/device number for each device of the distinct buses 202C (four in total). As previously noted, each individual device is uniquely identified by the triplet of bus, device, and function numbers. This triplet forms the so-called "device identification (ID)" value. During normal PCIe operation, the device ID is used to route certain packet classes through a PCIe network.

Figure 3:
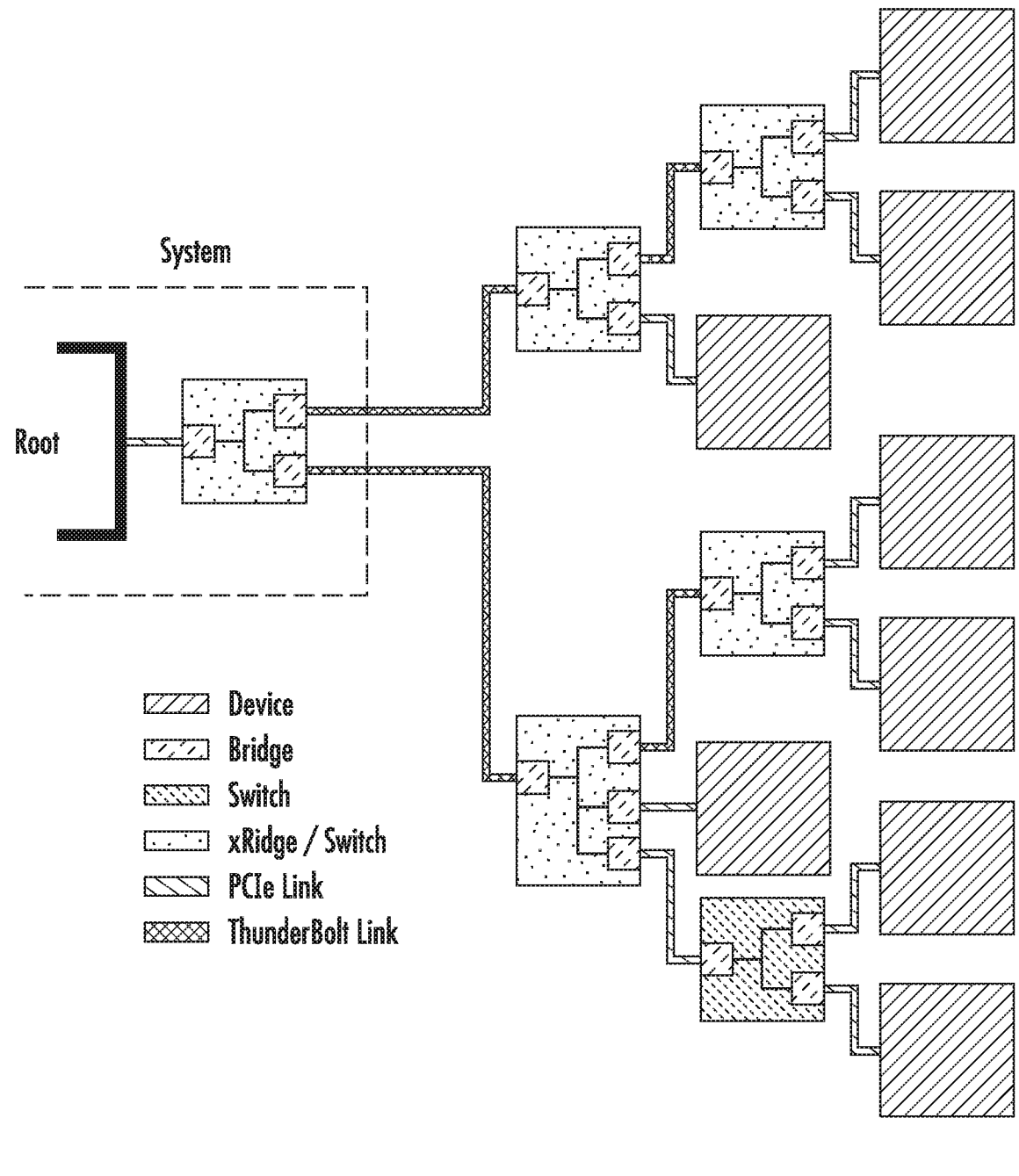
FIG. 3 is a logical block diagram representation of one exemplary Thunderbolt bus architecture.

FIG. 3 illustrates one Thunderbolt bus architecture configured to support eight devices via six switch components. A switch will always fan-out the bus, unless the system runs out of bus/device numbers to be assigned, however, the switches may or may not always be connected. For example, an exclusionary switch enables one device to the exclusion of the others. Thus, of the illustrated eight devices of FIG. 3, only seven of them are connected at any time. Due to the way PCIe routing resources are assigned, these seven devices consume twenty bus/device numbers out of the maximum two-hundred fifty six (256) bus/device numbers available. Current enumeration software pre-allocates bus/device numbers among the different Thunderbolt branches a given system can support.

Unfortunately, once assigned, bus/device numbers cannot be reassigned to another branch without considerable difficulty. As a brief aside, PCI was originally designed for attaching hardware to a computer bus, and did not initially support dynamically changing computer (or network) topologies. While subsequent technologies (such as Thunderbolt, and PCIe) support "hot-plugging", prior art PCIe bus enumeration schemes do not dynamically re-allocate bus/device numbers during operation. Instead, some PCIe implementations can halt all ongoing traffic and execute a modified enumeration process to reassign bus numbers so as to balance the network topology. Generally, the typical consumer electronics user is unlikely to be aware of the limitations of PCIe routing; thus, if a user creates an uneven network topology by adding more devices to one branch than another, then the (very likely) possibility exists that the Thunderbolt network will run out of bus/device numbers. From a user experience standpoint, the inexplicable nature of why devices only operate when connected in a certain way (and/or briefly halt operation to re-enumerate) can be confusing and frustrating.

With current systems, the routing resources available are adequate for most consumer uses. However, the number of Thunderbolt capable ports are likely to increase in future products and Thunderbolt fan-out devices will also be introduced; thus, existing routing resources will be strained and/or unable to meet the requirements of future systems. Accordingly, the present disclosure describes methods and apparatus which are configured to augment existing bus/device numbers with a larger pool of routing resources and dynamically assign routing resources. These improvements will enable larger Thunderbolt networks and/or Thunderbolt network operation in applications that are characterized by a large number of hot-plug/hot-unplug events. More generally, various aspects of the present disclosure are directed to addressing problems with resource management in networks which are required to be dynamically reconfigured during operation. In particular, once initialized (e.g., booted), the exemplary networks tolerate the addition or removal of segments to the network topology.

Exemplary embodiments of the present disclosure are now described in detail. While these embodiments are primarily discussed in the context of a Peripheral Connect Interface Express (PCIe) operation within Thunderbolt topology, it will be recognized by those of ordinary skill that the present disclosure is not so limited. More generally, the principles described herein may be applicable to other PCI/PCIe based bus technologies which may exhaust routing resources (such as bus numbering) during bus enumeration and/or hot-plug/hot-unplug operation.

Methods—

Figure 4:
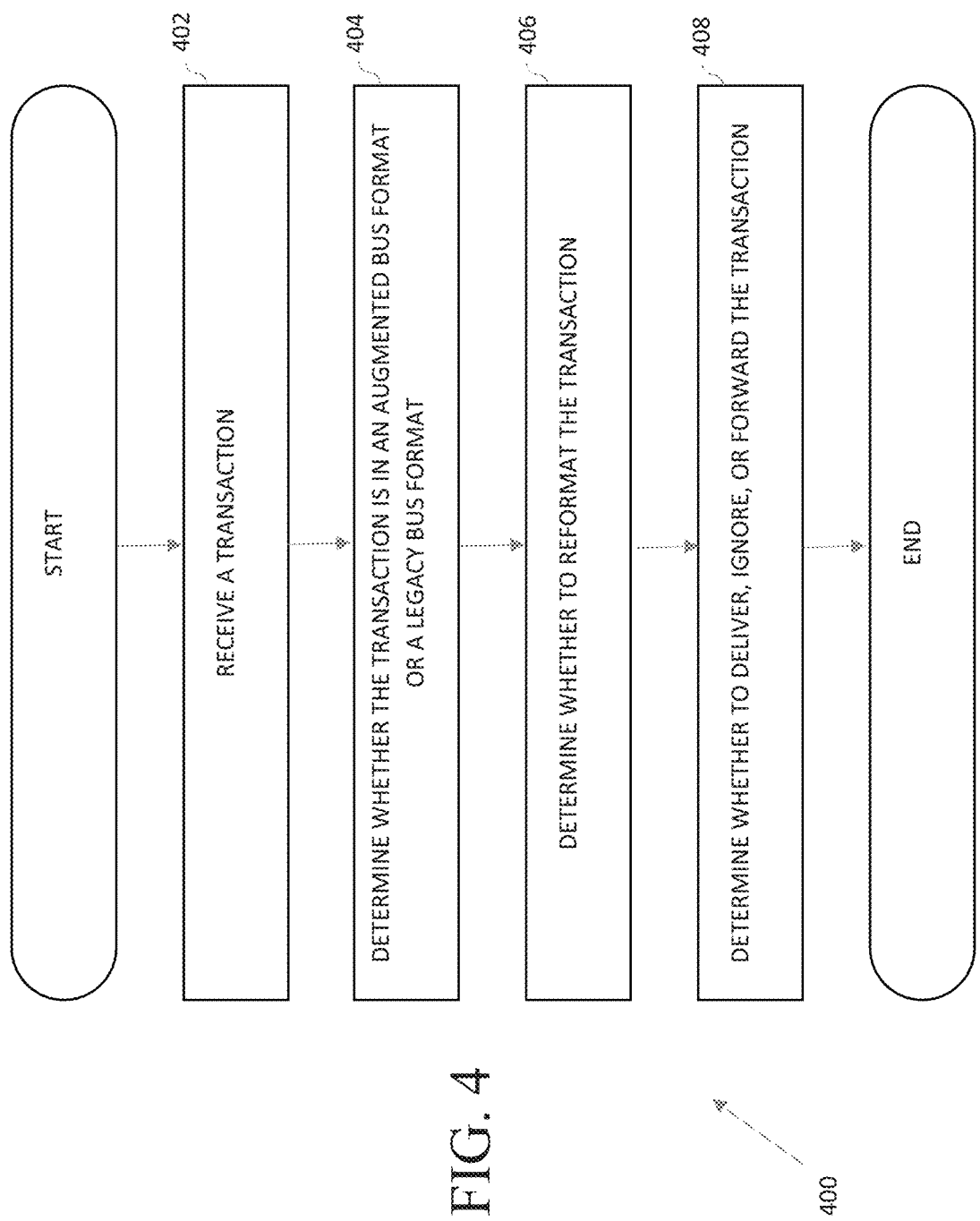
FIG. 4 is a logical flow diagram of one embodiment of a generalized method for processing transactions based on augmented routing resources, in accordance with the present disclosure.

Referring now to FIG. 4, one generalized method 400 for processing transactions based on augmented routing resources is illustrated.

At step 402 of the method 400, a transaction is received at a bridge device. In one exemplary embodiment, one or more bridge devices connect a host and a network of devices. In one such variant, the host includes a root complex which is the ingress/egress for all transactions between the host and the devices; similarly, each device includes an endpoint which is the ingress/egress for all transactions between the device and the host. In some embodiments, the bridge device is a top bridge (i.e., the upper most bridge of a network of bridges); in other embodiments the bridge device may be an intermediary bridge, or a node bridge (i.e., the lower most bridge of a network of bridges).

In some embodiments, a bridge is configured to couple a first bus to a second bus. In other embodiments, the bridge is configured to couple at least one primary bus to one or more secondary buses. In some such variants, the bridge connects a first bus to one second bus, to the exclusion of other buses. In other embodiments, the bridge splits and aggregates multiple buses together. Variants of bridges may additionally incorporate varying levels of intelligence. For example, some bridges may be "dummy" bridges that merely forward all traffic between buses; other bridges may be "smart" bridges which implement various additional capabilities. These capabilities may include, without limitation: quality of service (QoS) guarantees, flow control, error checking/correction, automatic repeat request (ARQ), etc.

In one exemplary embodiment of the present disclosure, the root complex, bridges, and devices are interconnected via a Thunderbolt PCIe network. Those of ordinary skill in the related arts will readily appreciate that the various principles described herein may be implemented within a range of other technologies, including without limitation: Peripheral Component Interface™ (PCI), PCI-Express™ (PCIe), PCI-eXtended™ (PCI-X), FireWire™, Display-Port™, Universal Serial Bus™ (USB), High Definition Multimedia Interface™ (HDMI), etc.

In one exemplary embodiment, the transaction is a configuration request that specifies one or more parameters within a configuration space of a corresponding device. In one such variant, the device is accessible via memory accesses (e.g., data reads or writes), in accordance with the one or more parameters that are set within the configuration space. For example, one parameter which may be set from the configuration space is the addressable region that corresponds to the device within a system memory map.

In one exemplary variant, the configuration requests are of two types: a type 0 configuration request that is sent only to the device for which it is intended, and a type 1 configuration request that is forwarded via switches/bridges toward a device for which it is intended. During normal operation, the switch/bridge that immediately precedes the actual target device will convert a type 1 configuration request to a type 0 configuration request. In one such variant, the conversion occurs at the node bridge. In some variants, a device that receives a type 0 configuration request will infer that the type 0 configuration request is intended for it, and updates its bus/device number fields to the values in the configuration request.

In a related variant, the switch/bridge connecting a root complex to one or more intermediary bridges is configured to convert a legacy type 1 configuration request to an augmented type 1 configuration request. In one such variant, the conversion occurs at the top bridge.

In some embodiments, the transaction may be a packet which includes a number of fields. In one exemplary embodiment, each packet is composed from a plurality of words of fixed length (e.g., 16 bits, 32 bits, 64 bits, 128 bits, etc.), where each word may be further subdivided into various fields. In some cases, the packet may include a prefix or postfix word or words. On such exemplary embodiment is based on the PCIe Transaction Layer Packet (TLP) which is composed of a number of so-called Dwords (32 bit words).

In one particular implementation, the packet may include one or both of a legacy format address, and an augmented format address. In one such case, the augmented format address is formatted so as to be ignored by legacy devices; for example, the augmented format address may be located within a field or fields that are ignored by legacy devices (e.g., reserved fields, proprietary fields, vendor specific fields, etc.) In one such embodiment, the address is a "triplet" identifying a bus number, a device number, and a function number, that the packet is addressed to. For example, the bus number identifies a bus associated with a destination device, the device number identifies the destination device (of the bus) that the transaction is addressed to, and the function number identifies the function of the destination device (devices may be single function or multi-functional).

In other embodiments, the address may represent a memory location, a memory range, etc. In other implementations, the transactions may be a combination of signals which are interpreted as e.g., address, data, and/or control signals. Still other variations of the foregoing elements will be readily appreciated by those of ordinary skill in the related arts, given the contents of the present disclosure.

At step 404 of the method 400, the bridge device determines whether the transaction is in an augmented bus format or a legacy bus format.

In some embodiments, the determination is based on a format of the transaction. For example, in one exemplary case, an augmented transaction is identified based on the presence of a prefix, postfix, and/or some other indicia. In other implementations, an augmented transaction is identified based on the contents of a field (e.g., a type or format field, etc.), and/or specialized signaling (e.g., dedicated hardware, etc.)

In some cases, other legacy devices of the network may be configured to ignore a transaction which does not conform to understood legacy formats and forward the transaction unmodified. In such networks, only bridge devices that recognize augmented bus formats will handle such transactions. In alternative situations, the legacy devices may be configured to ignore a transaction which does not conform to understood legacy formats; in some variants, the legacy devices may additionally destroy or attempt to modify the transaction (e.g., error recovery, etc.) In such networks, the bridge device can only receive the augmented transactions from other bridges that are capable of interpreting such augmented transactions (see also, step 408 of the method 400, infra).

In some embodiments, the determination is based on the contents of the transaction. For example, in some cases, transactions which are addressed to invalid legacy addresses are interpreted according to the augmented bus format. Other implementations may check the content of certain fields to determine subsequent action. Common examples of such operations include e.g., cyclic redundancy checks, parity checks, etc. In such networks, a legacy device may discard/destroy transactions which do not comply with the applicable check, whereas augmented bus capable devices may check to see whether the "failing" transaction is instead an augmented bus access.

In some embodiments, the determination may be based on the context of the signaling; for example, the bridge may be affirmatively switched or toggled between an augmented mode of operation and legacy operation in response to a particular condition. For example, higher layer application software may have previously configured the bridge in accordance with its current operations. In some embodiments, this configuration may be used for a certain number of accesses, a certain amount of time, and/or until otherwise affirmatively switched back. In one exemplary embodiment, once the configuration is set, it remains until rebooted (or otherwise reset).

Certain entities within the network may skip this determination step as a function of their location, functions, capabilities, etc. For example, the top bridge is the first bridge in an augmented bus capable network; accordingly, the top bridge may not need to determine whether the transaction is in an augmented format or legacy format (as the root complex may only transact legacy format transactions). Similarly, the node bridge may only support legacy devices on its downstream bus; thus, all packets received via its downstream bus are inherently legacy transactions.

When the transaction is in an augmented bus format, the bridge device determines whether the transaction should be reformatted to a legacy format, or alternatively when the transaction is in a legacy format, the bus determines when to reformat to an augmented bus format (step 406 of the method 400).

In one exemplary embodiment of the present disclosure, the transaction is reformatted based on the destination address of the transaction. For example, in one such case, the bridge determines that an augmented bus format transaction is addressed to a legacy device attached to a downstream legacy bus; responsively the bridge formats the transaction to a legacy format. In one such exemplary case, a node bridge receives an augmented type 1 configuration request and converts the transaction to a legacy type 0 configuration request. In another exemplary case, a node bridge receives an augmented type 1 configuration request and converts the transaction to a legacy type 1 configuration request which can be routed via subsequent legacy downstream buses. In still other embodiments, the bridge may determine that the transaction must be reformatted for its own internal purposes (e.g., so as to directly access the bridge's own internal configuration space, etc.).

In another embodiment, the transaction is configured to be reformatted based on neighboring device considerations. In one such embodiment, the transaction is reformatted to a legacy format based on the limitations of the upstream devices of the network. In another embodiment, the transaction is configured to be reformatted to a legacy format based on the limitations of the downstream devices of the network. For example, a link to a device that does not support augmented bus formats will require reformatting of transactions that are in augmented bus format. In another such example, if the downstream devices exceed the addressing capabilities of the legacy format, then at least a portion of the downstream devices must support augmented transactions to expand the bus.

In some cases, the neighboring device considerations may be based on one or more changes to network topology. For example, in one such embodiment, a downstream bridge or device which is hot-plugged or hot-unplugged may change the overall network topology (e.g., by destroying a branch of the network), or require a change to the network topology (e.g., by creating a branch for additional devices).

In some embodiments, the reformatting includes adding or removing one or more fields of the transaction. In some cases, the reformatting may additionally include adding or removing a prefix and/or postfix of the transaction. Common examples of reformatting include without limitation: modifying the contents of a field, adding/removing fields, swapping the contents of a field, padding/pruning the contents of a field, etc. In one exemplary case, the reformatting includes replacing a field containing a triplet of a bus number, device number, and function number, with the contents of an augmented bus number. In another exemplary case, the reformatting includes replacing a reserved field with the contents of an augmented bus number or a legacy triplet.

In one implementation, the augmented bus format is configured to be interpreted in conjunction with the legacy bus format. More directly, the augmented bus format in combination with the legacy bus format uniquely identifies each endpoint of the network. In other embodiments, the augmented bus format uniquely identifies at least a portion of the endpoints and can be interpreted without reference to the legacy bus format. In still other embodiments, the augmented bus format is a standalone format which does not require reference to the legacy bus format.

At step 408 of the method 400, the bridge device determines whether the transaction should be delivered, ignored, or forwarded to another bridge device (i.e., for subsequent delivery). For example, where the transaction is addressed to an endpoint of the bridge's downstream bus, the bridge device delivers the transaction to the endpoint. Where the transaction is addressed to an endpoint of another bridge's downstream bus, the bridge device forwards the transaction to the other bridge. Where the transaction is either malformed, corrupted, or otherwise cannot be correctly routed, then the bridge device may ignore or destroy the transaction. In some cases, the bridge device may also generate a notification of non-delivery or error to the originator (e.g., the root complex, etc.)

Example Operation—

One exemplary scheme for augmenting bus numbering within a Thunderbolt network is presented in detail. The exemplary scheme is configured to: (i) greatly expand the number of endpoints a Thunderbolt network can support; (ii) be fully contained within exemplary enhanced apparatuses (i.e., the exemplary scheme does not rely on legacy devices); (iii) increase available routing options; (iv) support legacy PCIe root complexes, switches, bridges, and endpoint devices; (v) transparently support input/output (I/O) direct memory access (DMA) and driver software operation (however, the configuration process may be modified); (vi) maintain support for $3^{rd}$ party PCIe features (e.g., Virtualization Technology for Directed IO (VT-d) protection); and (vii) conform to existing PCIe specifications to the maximum extent possible.

Figure 5:
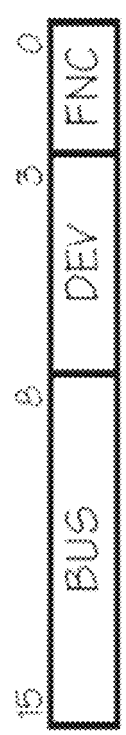
FIG. 5 is a logical representation of one exemplary legacy Peripheral Component Interconnect Express (PCIe) device identifier (ID) format as used within existing Thunderbolt networks.

FIG. 5 shows a logical representation of the format of an exemplary legacy PCIe device ID as used within the Thunderbolt "PCIe network". As shown, the legacy PCIe device ID is a 16 bit wide "triplet", which consists of 3 fields: an 8 bit field [15:8] represents the bus number; a 5 bit field [7:3] represents the device number; and a 3 bit field represents the function [2:0]. The maximum number of devices a traditional PCIe bus can support (in addition to itself) is 255 (as limited by the fixed nature of the bus number field). In practice, however, this number can never be reached since PCIe switches (which also consume bus/device numbers) are needed to provide fan-out.

In order to increase the number of devices a Thunderbolt PCIe network can support, the number of available PCIe bus/device numbers needs to be augmented with a pool of other routing resources. In one exemplary embodiment of the present disclosure, a second set of routing resources is created. Augmented Bus Numbering (ABN) allows the creation of a three tier bus numbering system. The first and third bus numbering tiers exist at the peripheries of the Thunderbolt PCIe network and use the legacy PCIe bus/device numbering (as described within e.g., PCI Express Base Specification Revision 3.1, previously incorporated herein by reference in its entirety). In particular, the buses starting from the root complex and ending with the first bridges supporting ABN are the first bus numbering tier. The third tier connects the ABN fabric to the subsequent PCIe endpoints. The second tier is interposed between the first and third tiers and makes use of the ABN formats. The ABN formats are only used within the interior of the "ABN network" or "ABN fabric" (which is sandwiched between the first and third tiers, and is thus necessarily subsumed within the larger Thunderbolt "PCIe network").

In one exemplary implementation, the third tier buses are created at the downward facing bridges exiting the second tier. Even though the third tier buses use the legacy PCIe bus numbering format, the third tier bus/device numbers do not match the bus/device numbers of the first tier. Rather each bus created by the downward facing bridge is referred to as a "node" which is unique and has its own set of bus numbers.

Within the context of the present disclosure, the root complex device is the "upper most" device of the network, and each terminating endpoint is the "lower most" device of that branch of the network. Thus, as used herein, the term "upstream" and "downstream" refer to a relative position within the network topology.

As used hereinafter, ABN configuration transactions are referred to as "ABN type 0/1 configuration transactions". As a brief aside, within the PCIe context, type 0 configuration transactions are sent only to the device for which they are intended, whereas type 1 configuration transactions are passed through intermediary entities (e.g., switches/bridges) for routing; the last intermediary entity before the actual target device will convert a type 1 configuration transaction to a type 0 configuration transaction. While ABN type 0/1 configuration transactions are substantially similar to legacy PCIe transactions; the present disclosure uses the foregoing naming convention so as to clearly identify that the ABN type 0/1 configuration transactions are generated from transactions within the ABN fabric, as distinguished from PCIe type 0/1 configuration transactions which are generated from transactions external to the ABN fabric.

Those of ordinary skill in the related arts will readily appreciate that the ABN numbering allows an additional level of "indirection" (i.e., the ability to reference an endpoint using an ABN device ID instead of a standard PCIe device ID). As described subsequently hereinafter, the PCIe routing information is encapsulated within the ABN type 0/1 configuration transaction for transport through the ABN fabric; once the ABN configuration transaction is delivered to the edge of the ABN fabric, the encapsulated PCIe routing information is used to reconstitute the PCIe configuration transaction.

Figure 6:
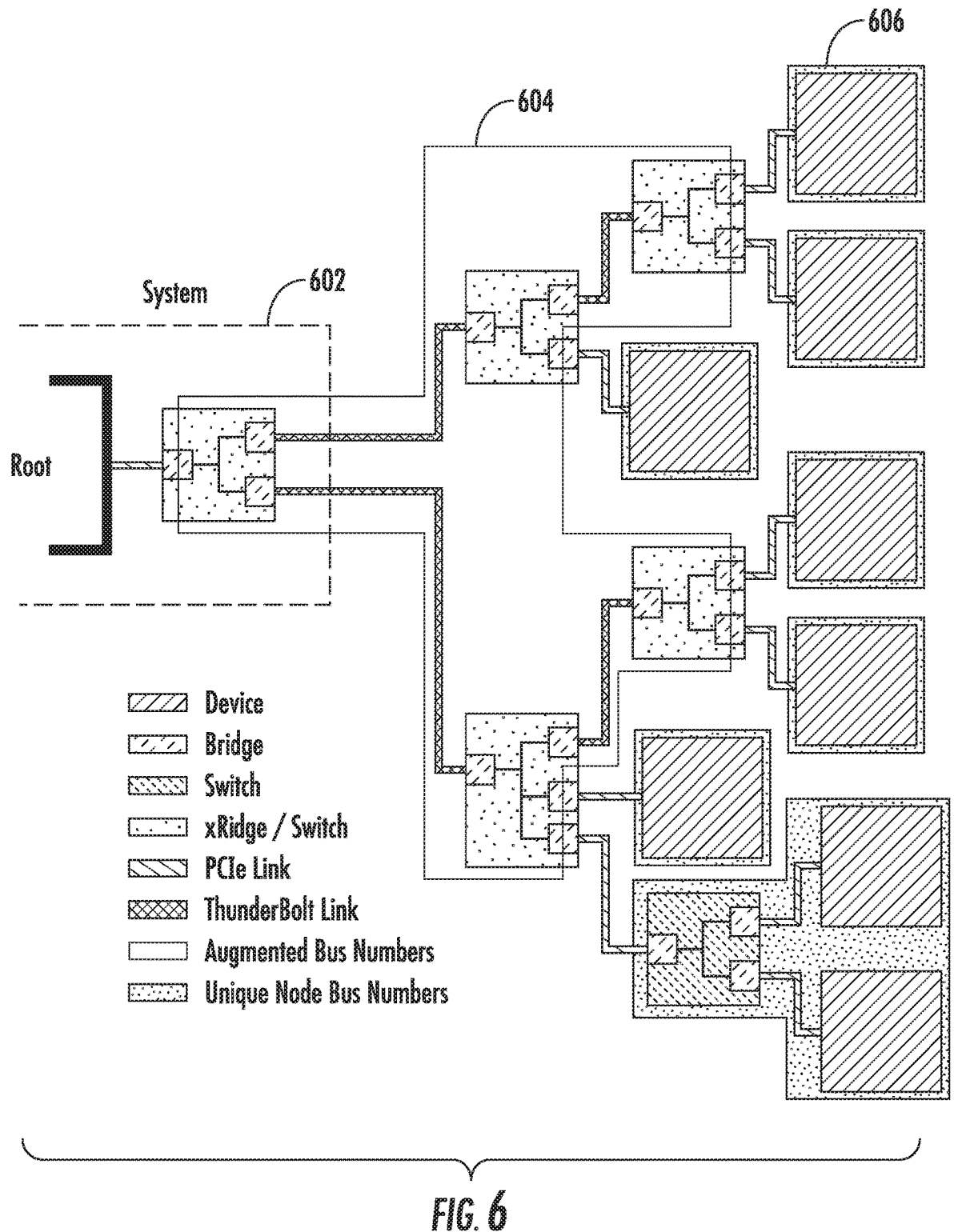
FIG. 6 is a logical block diagram illustrating one embodiment of the different numbering regions in an exemplary Augmented Bus Numbering (ABN) fabric, in accordance with the present disclosure.

FIG. 6 illustrates the different numbering regions in an exemplary ABN fabric. As shown, the result of having a three tier (i.e., first tier 602, second tier 604, and third tier 606) bus numbering scheme is a Thunderbolt PCIe network that is divided among a plurality of individually operating nodes. Each node has a distinct set of bus numbers that are available for routing. The total number of possible device numbers is described as the Augmented Bus Numbers×Node Bus Numbers. Those of ordinary skill in the related arts, given the contents of the present disclosure, will appreciate that the node behavior of the downward facing bridge greatly expands the available routing resources (e.g., by allowing duplicate bus numbers for each branch of the third tier). In one exemplary variant, the first bus number that is downstream from the bridge starts at 0x0 and each subsequent bus increments its bus number. Still other numbering schemes may be substituted, consistent with the present disclosure.

Exemplary Augmented Bus Numbering Formats—

Various implementations of the ABN formats are now described in greater detail. In one exemplary embodiment, each ABN format introduces a set of bits for defining the second tier address ABN bus numbers. As a brief aside, PCIe transfers are based on a packet delivery model. Each read or write transaction is contained within a packet that includes a header (which is either three or four 32 bit words (depending on if 32 or 64 bit addressing is used)), and a payload of one or more 32 bit words (referred to as "Dwords"). Each packet is called a Transaction Layer Packet (TLP).

The existing PCIe TLP format only has 8 unused reserved bits. Accordingly, some embodiments may commandeer the unused reserved bits for ABN address space. Other implementations may find this undesirable either because the 8 bit address space is too small, or perhaps to preserve the unused nature of the reserved bits for other reasons. For example, in one exemplary embodiment, the size of the ABN bus number field is 10 bits wide which exceeds the available reserved bits. While the following discussion is presented with respect to 10 bits, those of ordinary skill in the related arts given the contents of the present disclosure, can readily create variants with greater or smaller ABN bus number fields.

In the exemplary 10 bit embodiment, ABN operation requires a new set of bits for defining the second address tier bus numbers. Two different transaction formats for different types of transactions are now described.

Figure 7:
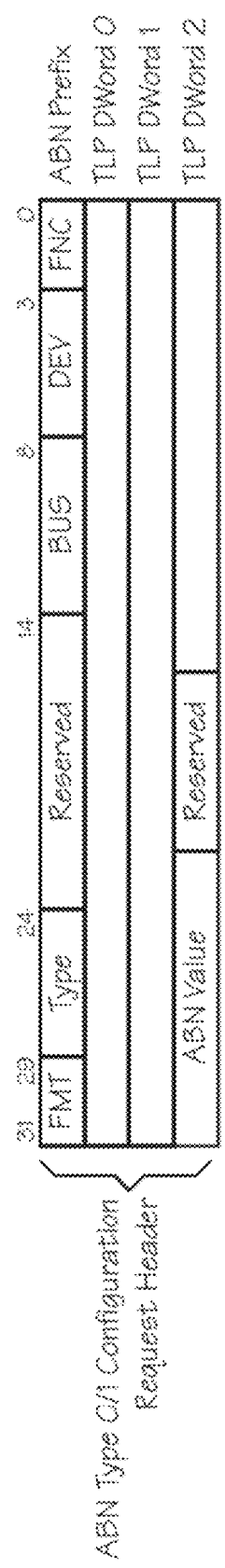
FIG. 7 is a logical representation of a first exemplary Augmented Bus Numbering (ABN) format that is encapsulated within a modified version of a Peripheral Component Interconnect Express (PCIe) End-End Transaction Layer Packet (TLP) prefix, in accordance with various embodiments of the present disclosure.

FIG. 7 illustrates a first exemplary format of an ABN configuration transaction. As shown, the ABN configuration transaction incorporates a modified version of the PCIe End-End TLP prefix in conjunction with a standard PCIe TLP. As a brief aside, ABN configuration request makes use of the PCIe End-to-End TLP prefix in the creation of the standard transaction within the third tier. The End-End TLP prefix travels with the TLP along the PCIe network based on the routing information contained in the TLP. In this case, the End-End TLP prefix has been modified to hold a device ID triplet (bus number [14:8], device number [7:3], and function number [2:0]) that is used for generating the standard type 0/1 configuration transactions. The location within the transaction TLP that is used to hold the target device ID (e.g., TLP DWord2[31:16]) in existing TLP formats, is modified to hold the target's ABN value (TLP DWord2[31:22]) and a reserved bit field (TLP DWord2[21:16]). As previously alluded to, the ABN value is the target ABN bus for the ABN configuration transaction (i.e., where an ABN type 1 configuration transaction is translated to an ABN type 0 configuration transaction).

In one exemplary embodiment, during normal operation, the ABN configuration transaction of FIG. 7 is generated by the root complex and propagated through the PCIe network to the ABN top bridge of the ABN fabric. The intervening PCIe bridges (if any) will disregard the modified End-End TLP prefix, whereas the ABN top bridge is configured to unpack the device ID triplet from the modified End-End TLP prefix so as to generate the appropriate ABN transactions for delivery via the ABN fabric to the target ABN bus.

Those of ordinary skill in the related arts will readily appreciate that the foregoing format of FIG. 7 is merely illustrative. For example, as shown, the format field [31:29] is set to the value 0x4, the type bit [29] is set to "1" to indicate an End-End TLP prefix. These values are set in compliance with PCIe legacy implementation rules. The remaining type bits ([28:24]) are set to the value 0xD, so as to violate PCIe legacy implementation rules (thereby ensuring these fields will be ignored). In other implementations, the various bits of the TLP End-End prefix may be set based on other vendor specific/proprietary considerations.

Figure 8:
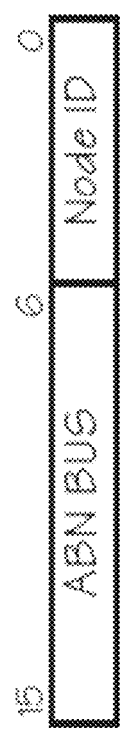
FIG. 8 is a logical representation of a second exemplary Augmented Bus Numbering (ABN) format that encapsulates an ABN device identifier (ID), in accordance with various embodiments of the present disclosure.
Figure 9A:
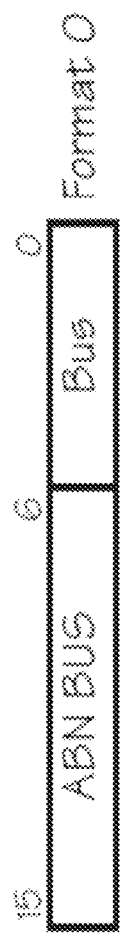
FIGS. 9A-9D are logical representations of various embodiments of a node field, useful in conjunction with the Augmented Bus Numbering (ABN) device identifier (ID) of FIG. 8.
Figure 9B:
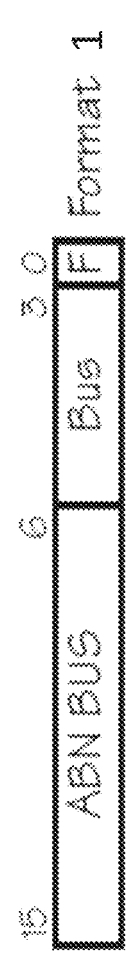
Figure 9C:
Figure 9D:
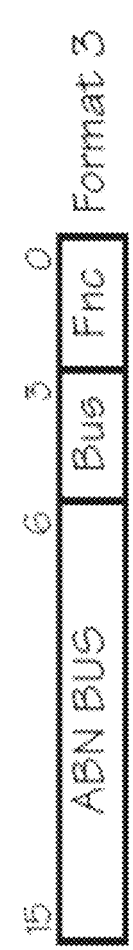

FIG. 8 illustrates a second exemplary format that is referred to as the ABN device ID. During normal operation, the ABN format is encapsulated within the 16 bit word, which can be used to replace the legacy PCIe TLP device ID field. This device ID definition change may be applied to any or all TLPs containing a device ID field (except for configuration transactions). This ABN format includes an ABN bus value [15:6], and a node identifier [5:0]. The ABN bus value holds the ABN value that is assigned to the bus that is downstream of the bridge connecting to the node identified by the node identifier field. As previously alluded to, the ABN device ID is only present in TLPs between the root complex and the bridge connected to the endpoint's node (i.e., the first and second tiers). The ABN device ID format is not present within the endpoint's node.

Unlike the format of FIG. 7 (which has a distinct End-End TLP prefix), the second exemplary format is incorporated within standard PCIe TLP device ID fields which have no other distinct attributes. The device ID field of FIG. 8 may further have different formats so as to further identify how the ABN device ID is used.

As illustrated in FIGS. 9A-9D, the node field portion of the ABN device ID of FIG. 8 can have one of 4 different forms. The various implementations of the node field include a bus number and a function number. The device number for all legacy PCIe endpoints is 0x0, and thus this field (which is traditionally present within a legacy PCIe triplet) is removed. Additionally, since each node may or may not have endpoints containing multiple functions, the enumeration software can determine the number of functions within a node and configure the bridge creating the node to select the appropriate node ID format to allow access to the functions. This allows the maximum number of bus numbers within a given node. For example, if all of the endpoints within a node are single-function endpoints, then the function field may be wholly eliminated (i.e., the bridge would be configured as a format 0 bridge).

Those of ordinary skill in the related arts will readily appreciate that aforementioned formats are described for use with typical PCIe implementations. In proprietary and/or vendor specific contexts, the aforementioned formats may be readily modified and/or substituted with other transaction formats, the foregoing descriptions being purely illustrative of the principles described herein.

ABN Bridge Operation, Fabric—

Figure 10:
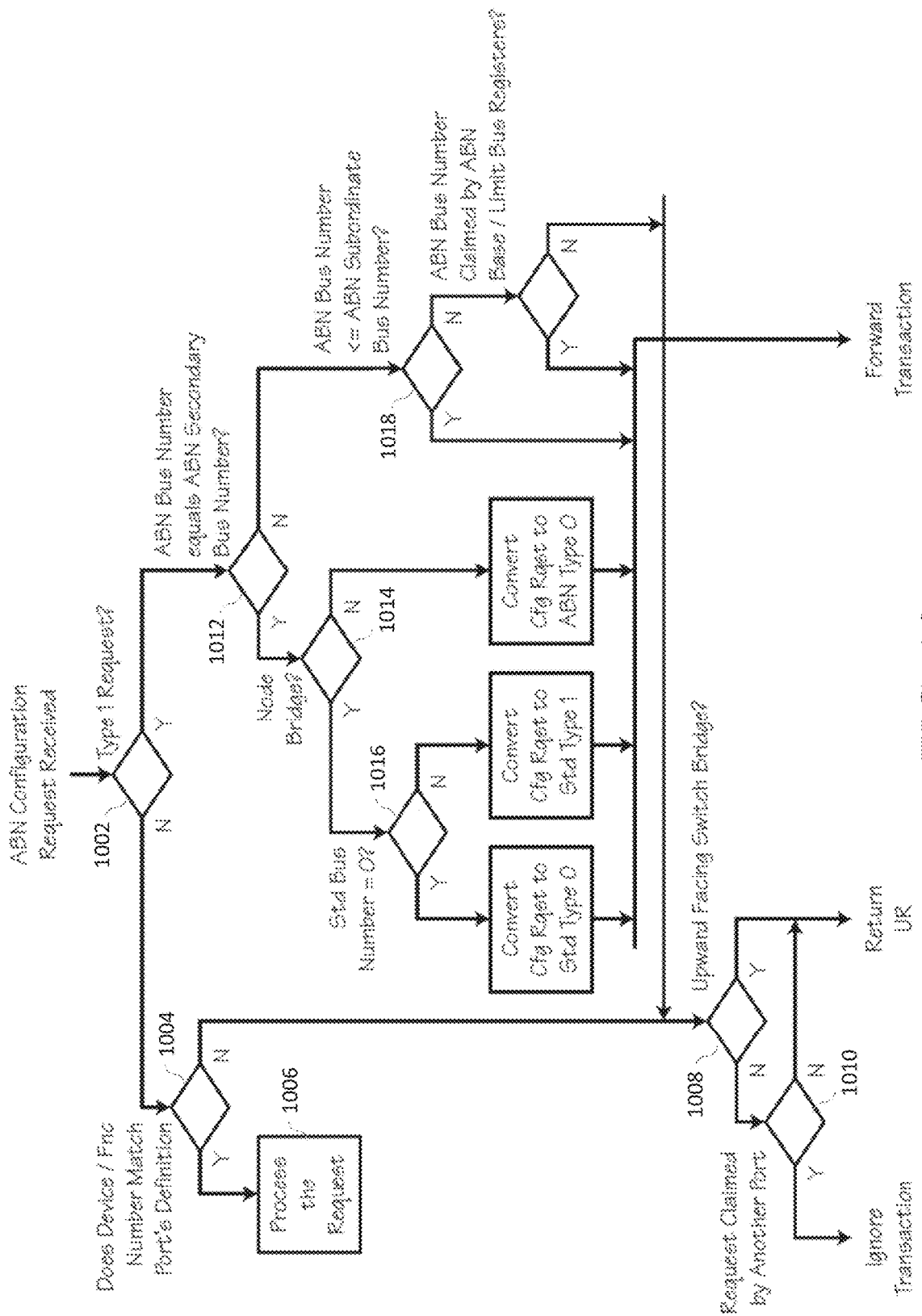
FIG. 10 is a logical flow diagram representation of one exemplary method for processing an Augmented Bus Number (ABN) transaction, in accordance with one exemplary embodiment of the present disclosure.

An ABN fabric is composed exclusively of ABN bridges that are configured to support the required ABN constructs along the topology between the root complex and the node that services the endpoint of interest. In one exemplary embodiment, each ABN bridge of this ABN fabric must be able to accept and process both ABN type 0 and 1 configuration transactions. FIG. 10 is a logical flow diagram representation of one exemplary method 1000 for processing an Augmented Bus Number (ABN) transaction.

As previously alluded to, in order to address devices of the ABN network, a PCIe root complex performs a PCIe memory access (e.g., read, write, etc.) to the ABN top bridge; the address bits of the PCIe memory access are used to generate an ABN type 1 configuration transaction. The ABN type 1 configuration transaction is propagated from the top of the ABN network topology downward toward subsequent ABN bridges, etc.

At step 1002 of the method 1000, the ABN bridge receives an ABN configuration request and determines whether the ABN configuration request targets the ABN bridge's bus (i.e., is an ABN type 0 configuration request) or should be forwarded on (i.e., is an ABN type 1 configuration request). As described hereinafter (see e.g., step 1012), an ABN type 0 configuration transaction is only generated when an ABN type 1 configuration transaction has reached its destination ABN secondary bus (resulting in an ABN type 0 conversion).

For ABN type 0 configuration requests, the ABN bridge determines whether the ABN type 0 configuration request is addressed to its own device number and function number (step 1004); if so then the ABN bridge processes the request internally (step 1006). If the ABN type 0 configuration request is for an upward facing switch bridge, then the ABN bridge returns an Unsupported Request (UR) (step 1008). Additionally, if the ABN type 0 configuration request is for another port, then the ABN bridge can safely ignore the transaction, otherwise the ABN bridge returns an UR (step 1010).

For ABN type 1 configuration requests, the ABN bridge determines whether the ABN bus number equals the ABN secondary bus number (step 1012), which signifies that the ABN type 1 configuration request has reached its destination ABN bridge and must be either converted to an ABN type 0 configuration request or reconstituted into a PCIe configuration request (for routing via a third tier PCIe branch of the network). If the ABN bridge is a node bridge for PCIe devices (step 1014), then when the PCIe bus number is 0x0 the ABN configuration request is converted to a PCIe type 0 configuration request; otherwise the ABN configuration request is converted to a PCIe type 1 configuration request (step 1016). When the ABN bridge is not a node bridge for PCIe devices, the configuration request is converted to an ABN type 0 configuration request. The resulting converted configuration request is forwarded appropriately.

As a brief aside, converting an ABN configuration request to a standard PCIe configuration request includes removing the End-End TLP prefix and replacing the ABN number and reserved fields of the TLP with the bus number, device number, and function number triplet which was encapsulated in the TLP prefix. Minor formatting may additionally be performed (e.g., padding bits [31:30] of Dword2 with zeros).

However, if the ABN type 1 configuration request is not at its destination ABN bridge, then the bridge determines whether the ABN type 1 configuration request should be forwarded to an ABN subordinate bridge (i.e., when the ABN bus number is less than or equal to the ABN subordinate bus number, or where the ABN bus number is claimed by the ABN base and/or limit bus registers) (step 1018). Otherwise, the ABN type 1 configuration request is ignored and/or an unsupported request (UR) is flagged (step 1010).

In view of the foregoing exemplary method 1000 for processing an ABN transaction, those of ordinary skill in the related arts will readily appreciate that access to a device's configuration register space is agnostic and independent of the method used to create the configuration request. More directly, from the transaction target's point of view, there is no difference if the original transaction accessing the configuration space originated as a legacy PCIe or ABN configuration request.

ABN Bridge Operation, Top Bridge—

As previously alluded to, the ABN fabric is subsumed within the larger Thunderbolt PCIe network. The upper most boundary of the ABN fabric is controlled by the upward facing ABN bridge closest to the root complex. In one exemplary embodiment, this so-called "top bridge" is configured to create the ABN configuration requests. Additionally, non-posted transactions are integral to the operation of PCIe, thus the ABN top bridge must manage non-posted requests received from upstream components (e.g., the root complex).

Generally, most processor systems do not have an inherent ability to create PCIe configuration requests; instead, the computer architecture provides a region within the system's memory map which corresponds to a dedicated hardware translator for PCIe accesses. When the region is accessed, the dedicated hardware translator generates a PCIe configuration request. For example, a memory write to this memory region results in a PCIe configuration write request; likewise, a memory read generates a PCIe configuration read request.

Figure 11:
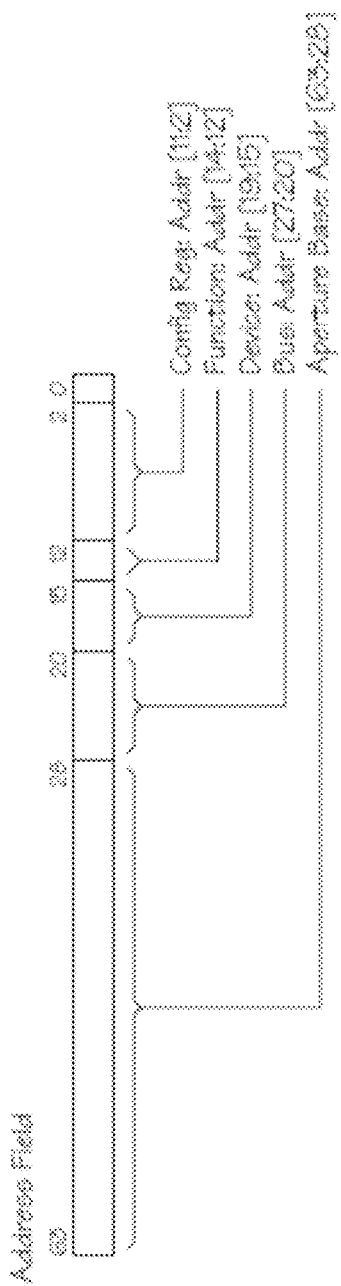
FIG. 11 is a logical representation of an address field for use in legacy Peripheral Component Interconnect Express (PCIe) transactions.
Figure 12:
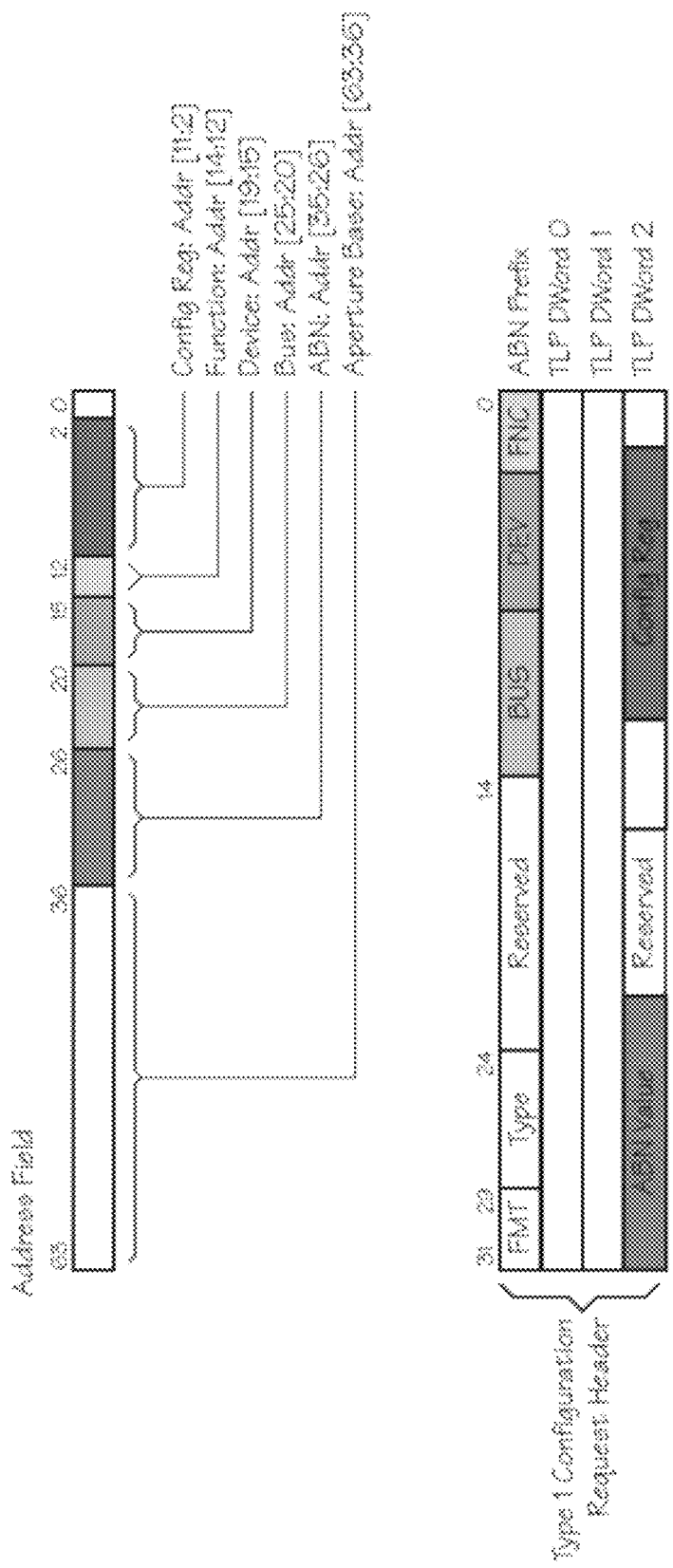
FIG. 12 is a logical mapping of an address field to an Augmented Bus Numbering (ABN) End-End Transaction Layer Packet (TLP), in accordance with the various embodiments described herein.

As shown in FIG. 11, in most legacy PCIe implementations, the size of the memory region is 256 MBytes ($2^{28}$). When a memory transaction targets the memory region, the lower 28 address bits are used to populate fields within the configuration request's TLP. In contrast, for ABN capable implementations, the creation of an ABN configuration request is accomplished by accessing an augmented memory region within the system's memory map. In one exemplary embodiment, the ABN configuration transactions are allocated a memory region spanning 64 GBytes ($2^{36}$). As shown within FIG. 12, the number of bits within the address field allotted for the bus number definition is different than the legacy PCIe bus/device number. Specifically, the size of the bus field [25:20] is reduced by 2 bits compared to the legacy bus field [27:20], and an ABN field [35:36] is added; the size of the ABN field matches the maximum bus field an ABN device ID can hold when the ABN device ID is being used in a TLP transiting the ABN fabric (other than a ABN type 0 configuration transaction).

Figure 13:
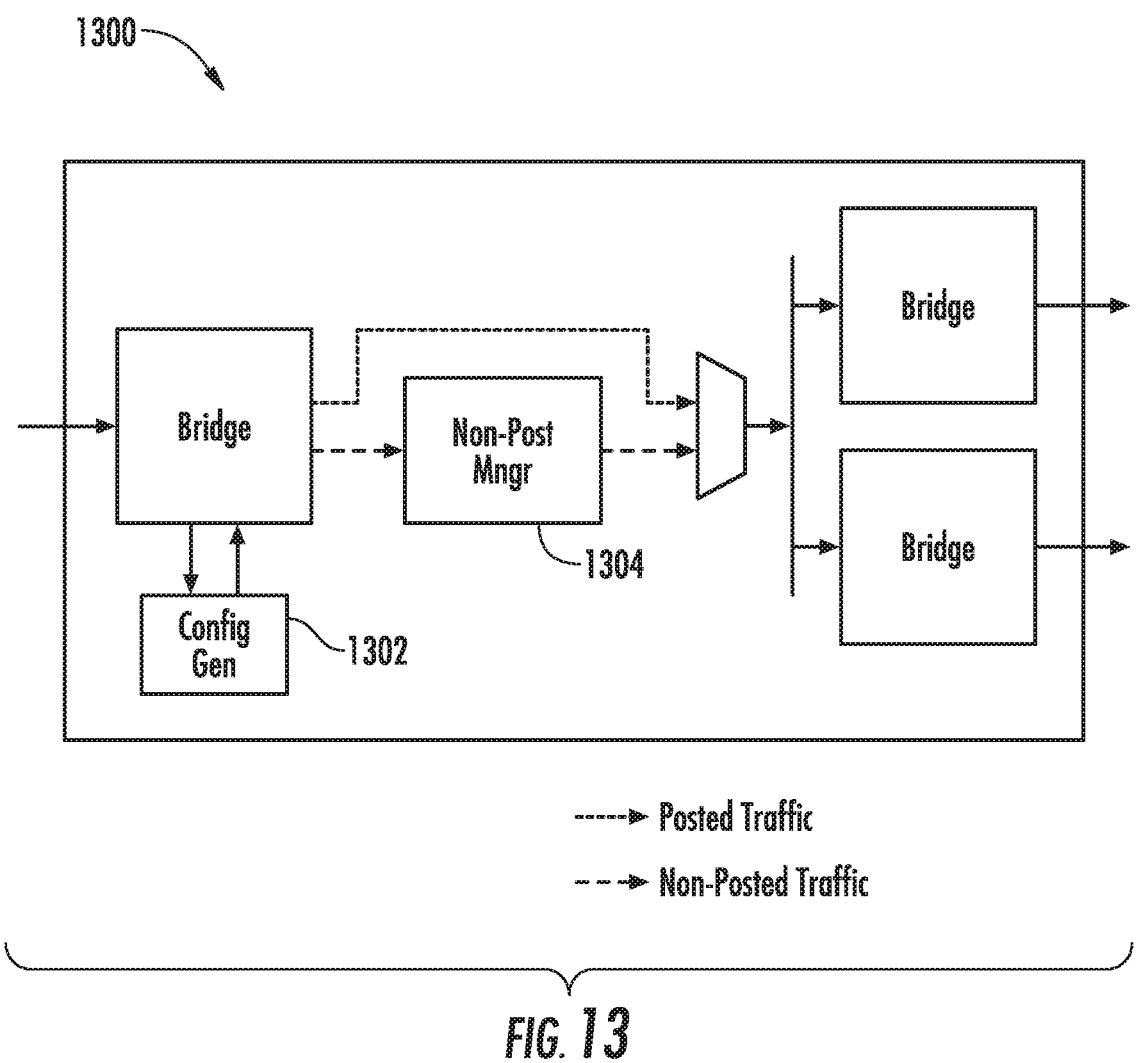
FIG. 13 is a logical block diagram of one exemplary top bridge apparatus, useful in conjunction with various embodiments of the present disclosure.

FIG. 13 illustrates one exemplary top bridge apparatus 1300. As shown, in one exemplary embodiment, the Thunderbolt PCIe configuration transactions are produced by the system's chipset, whereas the ABN configuration requests are produced within the ABN fabric's top bridge configuration generation unit 1302. The top bridge's Base Address Registers 0/1 (BAR 0/1) are configured as a single 64 bit BAR. This BAR is used to request a 64 GByte region of system memory. Accesses to the aforementioned BAR are configured to produce configuration cycles under software control; thus, in one exemplary variant, the BAR is used to represent a 64 Gbyte region of non-prefetchable memory (so as to ensure that undesired configuration transactions are not generated by processor prefetch hardware units outside of explicit software control). The resulting region of memory is a so-called "aperture" that is used by enumeration software to create ABN type 1 configuration requests. Bits [35:2] of the address field (see e.g., FIG. 12, supra) are used by the configuration generation unit 1302 to populate the resulting configuration TLP and End-End TLP prefix. Once created, the resulting ABN TLP is properly formatted for routing via the ABN fabric, and is passed back to the top bridge for distribution.

In some embodiments, the ABN top bridge also manages non-posted transactions received on the top bridge's upward facing port via a non-posted transaction manager 1304. As a brief aside, so-called "posted" transaction is a transaction that does not wait for a completion response to indicate success or failure of the transaction. In contrast, a "non-posted" transaction (e.g., non-posted write, etc.) is a transaction that waits for a completion response to indicate success or failure of the transaction. While posted transactions do not impose any particular limitations; at least minimal flow control is necessary to support non-posted operation. In the exemplary embodiment, only the transactions that are destined to be forwarded through the ABN top bridge into the ABN fabric are managed (i.e. requests targeting the top bridge's own configuration space can be directly handled).

As a brief aside, when a device within a node returns a completion, the completion makes use of the requester ID (of the original access) for routing. Consequently, the requester ID must be managed and made unique by the ABN top bridge to ensure that the requester ID does not match the device ID within the node. More directly, unlike posted transactions, non-posted transactions (e.g., non-posted writes or reads) must respond to the originator to indicate success or failure. Since the ABN bus number may not be unique within the overall Thunderbolt PCIe network and/or various other ABN network fabrics (i.e., matching PCIe bus numbers and the ABN fabric bus numbers causes an "aliasing" problem), each ABN number within the fabric must be made unique or otherwise isolated from the rest of the Thunderbolt PCIe network (thereby enabling proper routing of the completion responses).

In one embodiment, the outbound non-posted requests are rendered unique via a two-step process executed by the non-posted transaction manager 1304. First, the requester ID value of the transaction is replaced with an ABN requester ID value that can be used within the ABN fabric (but which may not be unique within the Thunderbolt PCIe network). The request's tag value also needs to be replaced since it may also alias with other network requests. The request's original request ID and tag values are recorded by the non-posted TLP management unit 1304 within the top bridge. The non-posted transaction manager 1304 also assigns a unique tag value to the transaction; thereafter the converted request is presented to the switch's ABN secondary bus for routing via the ABN fabric.

In one such exemplary embodiment, in order to ensure that the completion is routed to the ABN top bridge, the bus value of the requester ID should be set to 0. The device value may be arbitrarily chosen. The top bridge can receive a transaction from two sources, each of which must be uniquely identified (i.e., an upward facing port of the bridge, or from an ABN configuration transaction generated by the bridge itself). Accordingly, in one exemplary embodiment, if the request was received from the link facing the root complex, the substituted requester ID value is set to 0:0:0 (Bus:Dev:Fnc). Otherwise, if the request originated from the ABN configuration generation unit 1302, then the substituted requester ID value is set to 0:0:1 (Bus:Dev:Fnc).

Once the completion response corresponding to a previous transaction has returned to the top bridge (i.e., received by the non-posted transaction manager 1304); the top bridge non-posted TLP management unit 1304 fetches the original request's requester ID and tag values (e.g., using the tag value contained in the completion TLP). The recovered values are replaced back into the completion TLP. The restored TLP is then forwarded towards the upward facing port of the bridge or the ABN configuration generation unit 1302. In the exemplary Thunderbolt PCIe context, the action is performed for all four types of completion (e.g., Successful Completion (SC), Unsupported Request (UR), Completer Abort (CA), and Configuration Request Retry Status (CRS)).

Finally, since the non-posted management unit 1304 has reissued the non-posted transaction internal to the ABN fabric, the non-posted management unit 1304 must also track the transaction. In one such implementation, the non-posted management unit 1304 includes a completion timeout function. If a completion is not received by the non-posted management unit 1304 before a timeout occurs, then the non-posted management unit 1304 will generate an Unsupported Request (UR) to the request's originator. Additionally, the root complex must also configure its completion timeout value to be much higher than the non-posted management unit's value. In this manner, the non-posted management unit 1304 can detect a timeout error and report back to the root complex before the root complex detects an error (which would result in a duplicative report).

ABN Bridge Operation, Node Bridge—

The lower most boundary of the ABN fabric is controlled by one or more node bridges. Each node bridge manages the downward facing boundary between the ABN fabric and its own distinct node bus. Each node specific bus numbering is managed by its node bridge. This bridge type is connected either to a Thunderbolt PCIe PHY or endpoint located within a switch. One such example of an endpoint within a switch is a Native Host Interface (NHI) which is a collection of direct memory access (DMA) engines that are used for software protocols and device discovery. The node bridge converts transactions between the different bus numbers used by the ABN fabric and the node bus. As was previously noted, the node bus numbers will not necessarily match the bus/device numbers of the Thunderbolt PCIe network.

In one exemplary embodiment, the node bridge converts outbound traffic from ABN formats to Thunderbolt PCIe formats (albeit with its own node specific bus numbering); inbound traffic is converted from Thunderbolt PCIe formats to ABN formats. As used herein, the term "outbound traffic" refers to traffic that is moving away from the ABN fabric towards an endpoint within a node (or other destination). Inbound traffic moves in the opposite direction; specifically, the term "inbound traffic" refers to traffic moving away from a node tier towards the ABN tier.

Exemplary Outbound TLP Conversion—

In the exemplary Thunderbolt PCIe context, the only TLP type modified in the outbound direction are completion TLPs. In one such implementation, the requester ID is modified by the Bridge. Depending on the operating mode set during device enumeration (see previous discussion of FIGS. 9A-9D), the outbound TLP conversion may vary slightly.

Figure 14A:
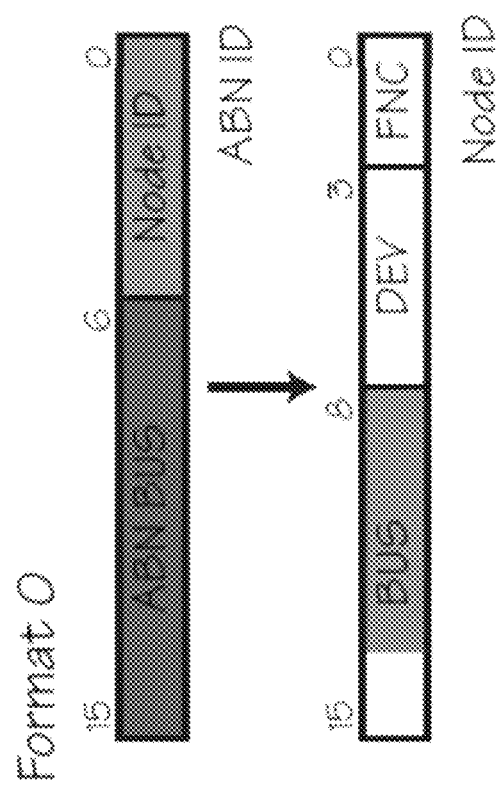
FIGS. 14A-14D are logical representations of various outbound Transaction Layer Packet (TLP) Augmented Bus Number (ABN) requester identifiers (IDs), useful in conjunction with embodiments of the present disclosure.

As shown in FIG. 14A, for ABN device IDs of Format 0, the ABN Bus value is discarded. Node ID bits [5:0] are used to populate bits [5:0] of the bus number portion in the TLP's requester ID field. All remaining requester ID bits are set to a null value (e.g., zero).

Figure 14B:
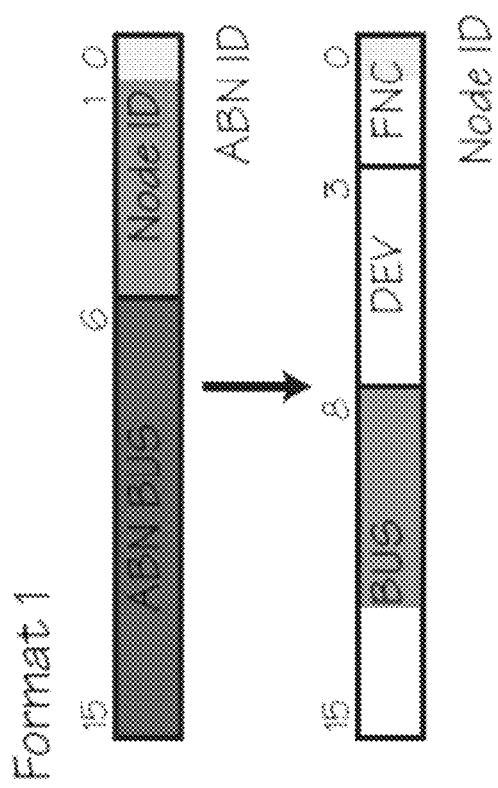

As shown in FIG. 14B, for ABN device IDs of Format 1, the ABN Bus value is discarded. Node ID bits [5:1] are used to populate bus number bits [4:0] in the TLP's requester ID field. Node bit [0] is used to populate bit [0] in the function field of the requester ID. All remaining requester ID bits are set to a null value (e.g., zero).

Figure 14C:
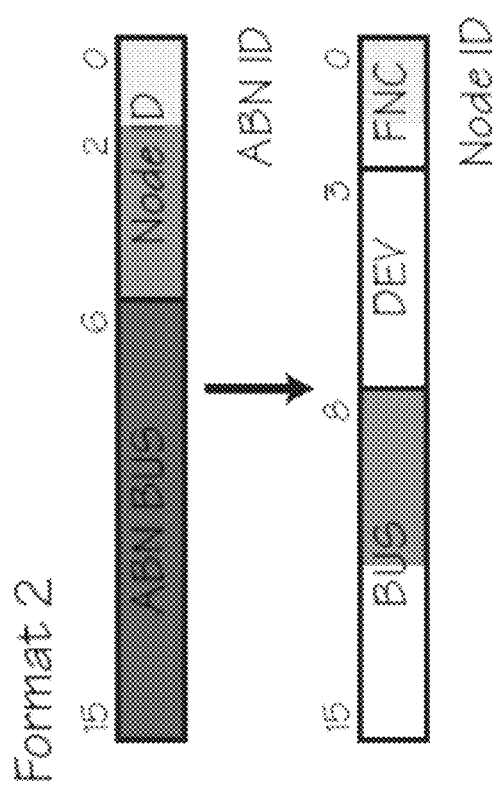

As shown in FIG. 14C, for ABN device IDs of Format 2, the ABN Bus value is discarded. Node ID bits [5:2] are used to populate bus number bits [3:0] of the TLP's requester ID field. Node bits [1:0] are used to populate bits [1:0] in the function field of the requester ID. All remaining requester ID bits are set to a null value (e.g., zero).

Figure 14D:
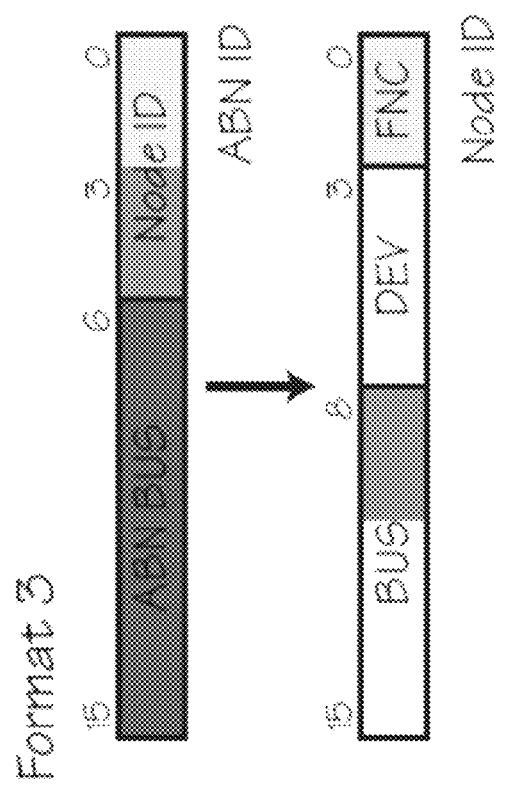

As shown in FIG. 14D, for ABN device IDs of Format 3, the ABN Bus value is discarded. Node ID bits [5:3] are used to populate bus number bits [2:0] of the TLP's requester ID field. Node bits [2:0] are used to populate bits [2:0] in the function field of the requester ID. All remaining requester ID bits are set to a null value (e.g., zero).

Inbound TLP—

In the exemplary Thunderbolt PCIe context, all transactions generated by endpoints within a node are modified by the node bridge as the TLP crosses from the node bus to the ABN fabric. The requester ID field is modified for both posted and non-posted requests. Additionally, the completer ID is modified for completion TLPs. Like outbound traffic, the modifications may slightly vary depending on the operating mode set during device enumeration (see previous discussion of FIGS. 9A-9D).

Figure 15A:
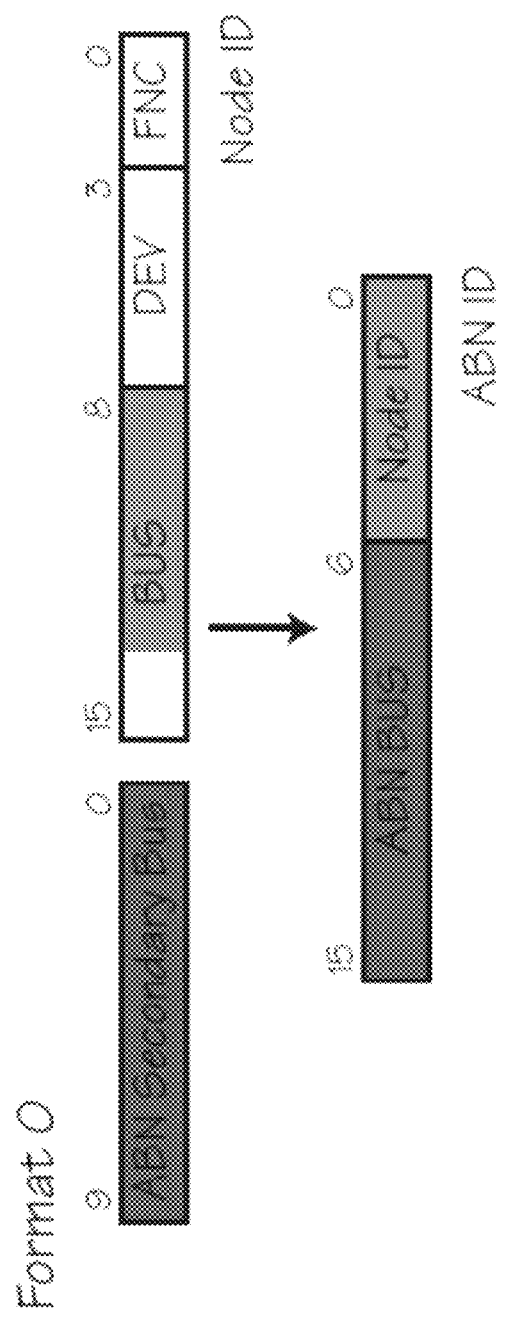
FIGS. 15A-15D are logical representations of various inbound Transaction Layer Packet (TLP) Augmented Bus Number (ABN) completer identifiers (IDs), useful in conjunction with embodiments of the present disclosure.

As shown in FIG. 15A, for ABN device IDs of Format 0, the ABN bus number found in ABN ID is sourced from the ABN secondary bus number of the node bridge. Bits [13:8] of the node ID are placed into the ABN ID bits [5:0].

Figure 15B:
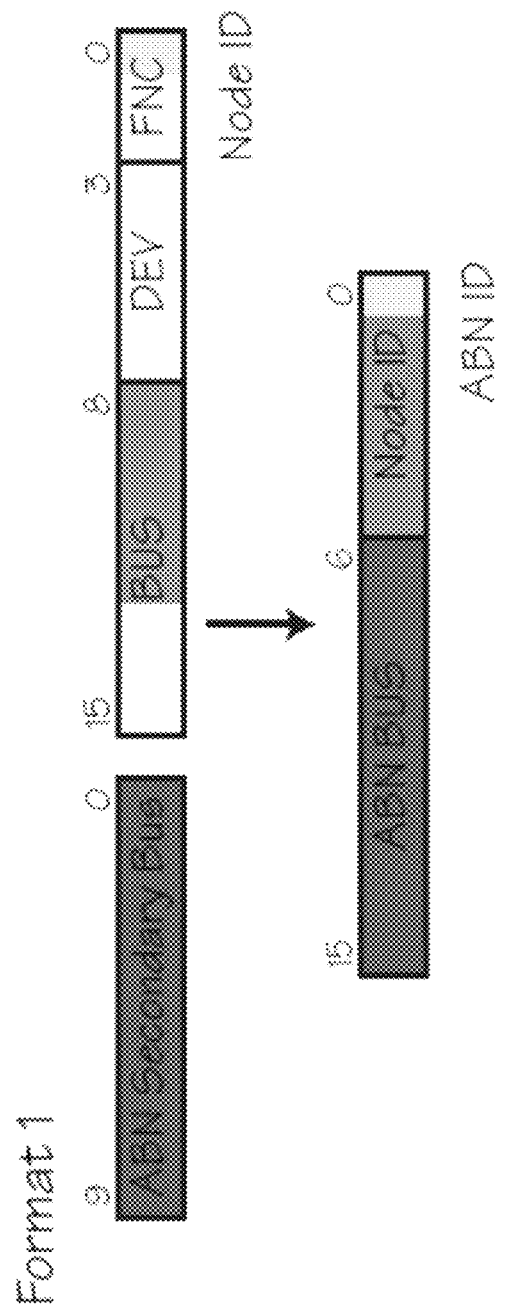

As shown in FIG. 15B, for ABN device IDs of Format 0, the ABN Bus number found in ABN ID is sourced from the ABN secondary bus number of the node bridge. Bits [12:8] of the node ID are placed into the ABN ID bits [5:1]. The node ID bit [0] is placed into the ABN ID bit [0].

Figure 15C:
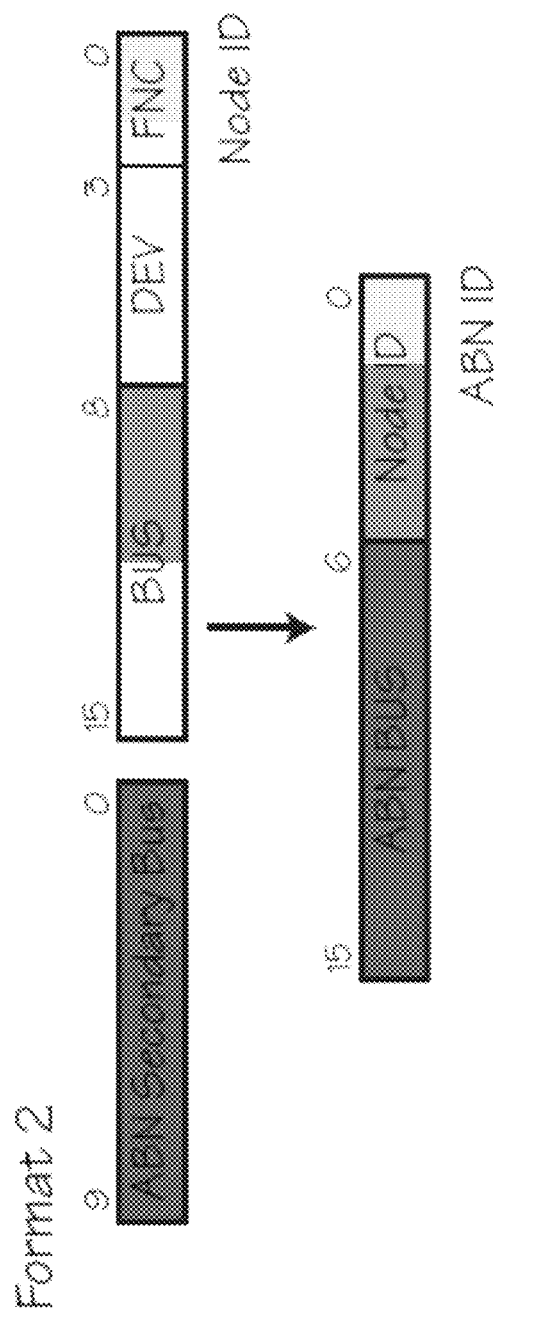

As shown in FIG. 15C, for ABN device IDs of Format 0, the ABN Bus number found in ABN ID is sourced from the ABN secondary bus number of the node bridge. Bits [11:8] of the node ID are placed into the ABN ID bits [5:2]. The node ID bits [1:0] are placed into the ABN ID bits [1:0].

Figure 15D:
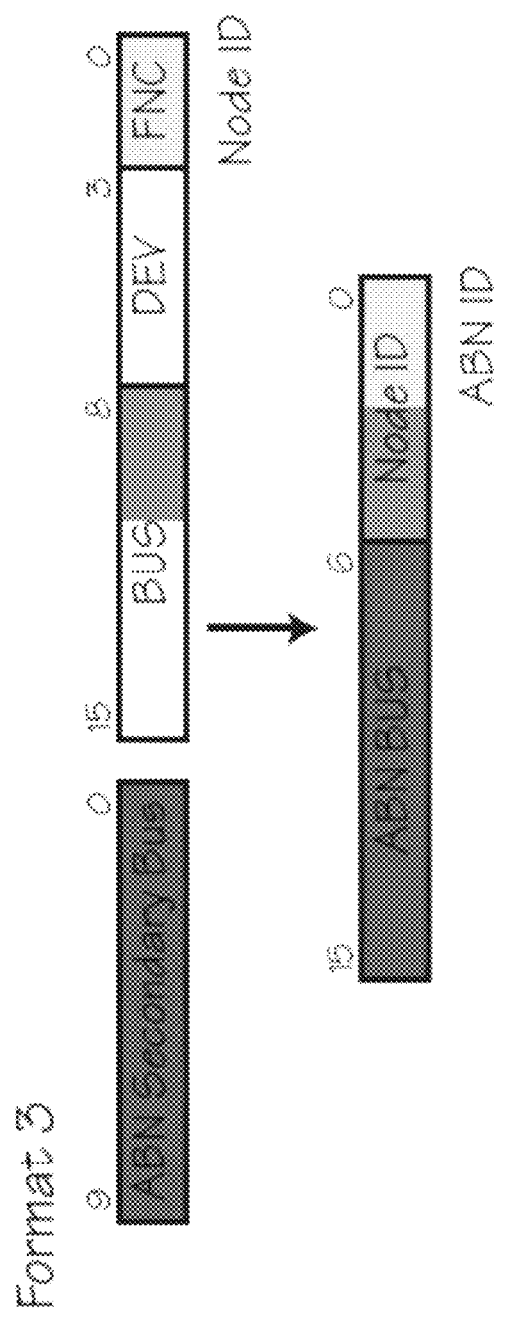

As shown in FIG. 15D, for ABN device IDs of Format 0, the ABN Bus number found in ABN ID is sourced from the ABN secondary bus number of the node bridge. Bits [10:8] of the node ID are placed into the ABN ID bits [5:3]. The node ID bits [2:0] are placed into the ABN ID bits [2:0].

ABN Bus/Address Routing—

FIG. 16 illustrates one exemplary data structure 1600 configured to store bridge routing resource allocations. Like existing PCIe architectures, the data structure 1600 includes an analogous structure of registers that identify a primary bus number 1602, a secondary bus number 1604, and subordinate bus number 1606. This data structure 1600 may be used in a manner substantially similar to PCIe primary, secondary, and subordinate registers (see e.g., the PCI Express Base Specification Revision 3.1, published Nov. 7, 2013, incorporated supra). While ABN and PCIe primary, secondary, and subordinate registers perform substantially the same function, they are separate and independent register blocks as both routing schemes are simultaneously used (routing via the PCIe network, and routing via the ABN fabric).

In some embodiments, the ABN bus ranging capability block makes use of PCIe vendor-specific capability definitions to allow the register block to be included in the bridge's configuration register space. In other embodiments, the register block may be discoverable via e.g., out-of-band discovery, proprietary mechanisms, etc. The ABN bus ranging capability block enables management of the hot-plugging and hot-unplugging of complex topologies to an operational Thunderbolt network.

In slightly more detail, the ABN primary bus number register 1602 identifies the ABN bus number of the bus connected to the ABN bridge's upward facing port. The ABN secondary bus number register 1604 identifies the ABN bus number of the bus connected to the ABN bridge's downward facing port. The ABN subordinate bus number register 1606 identifies the value of the last bus (highest bus number) connected to the ABN bridge's downward facing port.

In the illustrated embodiment, the exemplary data structure 1600 also holds four additional register pairs 1608 and a node format indication 1610. Other implementations may use a greater or fewer number of additional register pairs 1608, the disclosed embodiment being merely illustrative of the principles described herein. Each register pair 1608 is configured to create additional blocks of bus number ranges outside the block defined by the ABN primary bus number 1602, ABN secondary bus number 1604, and ABN subordinate bus number 1606 registers. Specifically, each register pair includes a bus number base 1608A, and a bus number limit 1608B. The bus number base 1608A identifies the first ABN bus number of a group of consecutive bus numbers (e.g., from a subsequent bridge node), the bus number limit 1608B identifies the last bus number of the group of consecutive bus numbers.

Finally, various other configuration information may be included. For example, the format indication 1610 identifies the appropriate format of the node (see also, FIGS. 9A-9D supra). The node format 1610 is used to define the type of format the node will use when making ABN node ID conversions. Generally, this format indication is determined by the enumeration software after the node has been examined and configured; the enumeration software determines the appropriate format indication 1610 after examining the devices which have been enumerated within the node, and sets this field accordingly. In one exemplary embodiment, the selected format is based on the device with the most functions.

During operation, transactions that are routed by ID are "claimed", forwarded, or ignored by the bridge based on the contents of the exemplary data structure 1600. For example, as a configuration request flows from the root complex through the ABN fabric, the configuration request is compared to the various fields of the exemplary data structure. In one exemplary implementation, the comparison is a logical "OR" of the results of the bus ranging comparators. The bus ranging comparators compare the ABN device ID to the PCIe secondary and subordinate registers, the ABN secondary and subordinate registers, and the ABN bus base number and limit sets. If the ABN device ID falls within those addresses, then the bridge claims the transaction; otherwise the transaction is ignored. Those of ordinary skill in the related arts will readily appreciate, given the contents of the present disclosure, that only a single bridge at a time will claim the transaction as it propagates through the network/fabric, until it reaches its final node and/or other terminal endpoint.

In other embodiments, an ABN bridge may include a set of additional registers to identify additional address ranges that the bridge is also able to claim. In one such implementation, the bridge implements an extended memory range capability via another PCIe vendor-specific capability definition. FIG. 17 illustrates one such exemplary data structure 1700 configured to store additional memory ranging capabilities within the bridge's configuration register space. As shown, the additional memory range capability block is composed of four sets of upper and lower address bases and upper and lower limit registers. Each address base and limit pair denotes an address range checking block (e.g., a 64 bit address range). Transactions flowing from the root complex with a target address value within the range will be claimed by the bridge and forwarded.

Enumeration and Legacy Support—

Since ABN fabric operation moves beyond the capabilities of PCIe operation, the ABN fabric cannot be enumerated using the traditional PCIe software enumeration process. In one embodiment, in order to avoid the possibility of incorrect bus numbering, the ABN fabric is enumerated as a separate process from the rest of the PCIe network.

Figure 18:
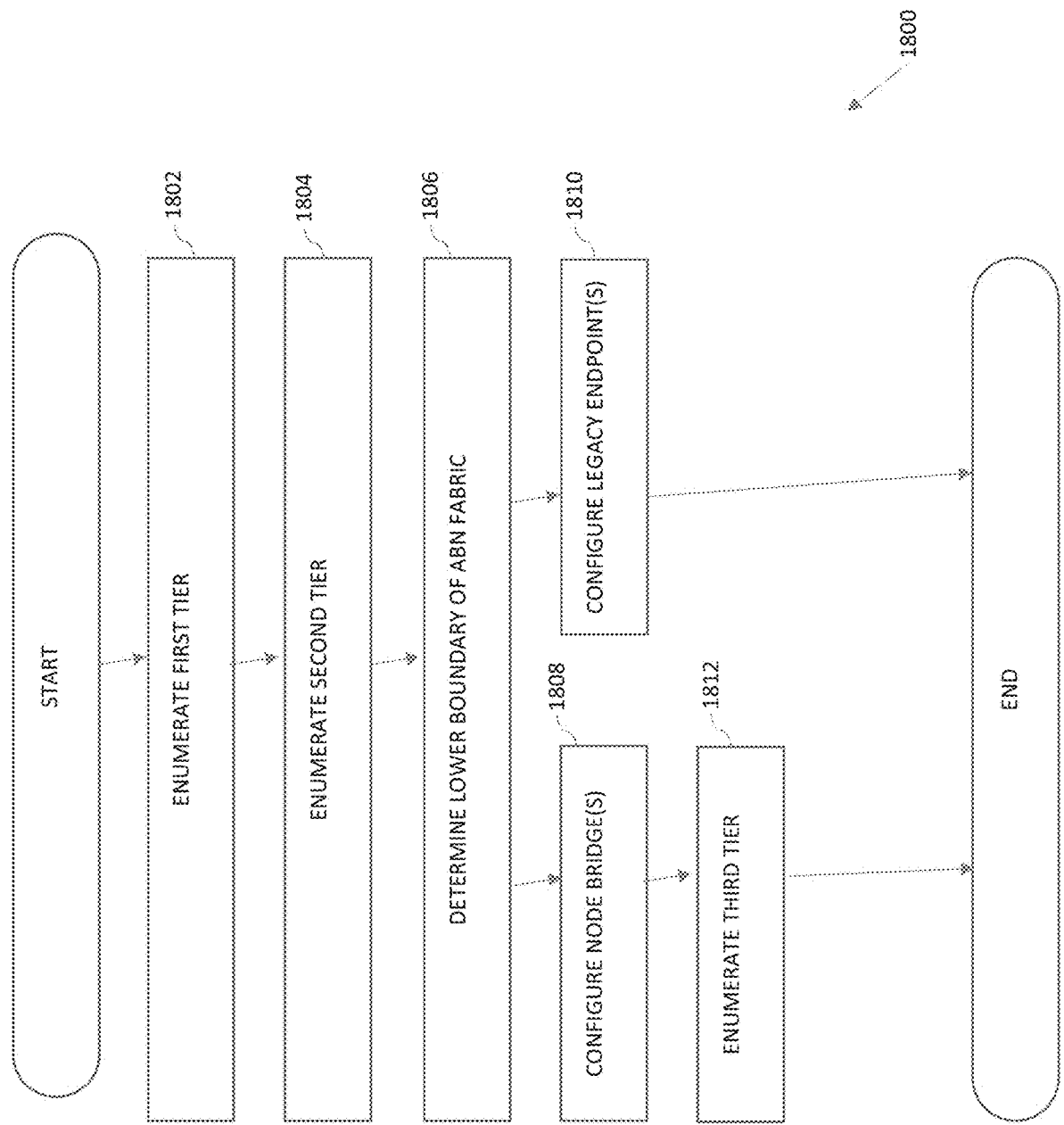
FIG. 18 is a logical flow diagram representation of an exemplary method for an Augmented Bus Number (ABN) fabric enumeration process of a Thunderbolt network, in accordance with the present disclosure.

FIG. 18 illustrates one exemplary flow diagram of an ABN fabric enumeration process of a Thunderbolt PCIe network.

At step 1802 of the method 1800, the first tier of a Thunderbolt PCIe network is enumerated to discover all PCIe resources of the PCIe network up to and including an ABN top bridge. As per existing PCIe enumeration, each of the PCIe resources is assigned PCIe bus/device numbers that are unique to the Thunderbolt PCIe network. In one such implementation, the bus numbering for each of the PCIe resources starts with the value 0x0. Once the ABN top bridge is encountered, bus enumeration is halted for resources below the ABN top bridge. In some cases, the resources below the ABN top bridge may be reset (or otherwise set to a known state). Additionally, the ABN top bridge may set its ABN secondary and subordinate registers to zero (or another null value). During this step, the primary bus number register of the ABN top bridge is assigned.

After the local PCIe enumeration can no longer progress (i.e., only devices within and below the ABN fabric remain), then the ABN enumeration of the second tier starts (step 1804). The initial ABN bus number is found by taking the highest PCIe bus/device value found during the Thunderbolt PCIe enumeration, incrementing by one and then multiplying by a factor to account for the bus expansion capability. In one such variant, the factor is the number of register pairs that are configured to create additional blocks of bus number ranges outside the block defined. For example, if the last bus number used in step 1802 is 0x5, then the first ABN bus number is 0x18 (i.e., (0x5+0x1) multiplied by 0x4). The resulting value (e.g., 0x18) is placed into the ABN secondary bus register of the ABN top bridge. Note that the ABN primary bus number has no meaning in the ABN top bridge.

At step 1806, each bridge of the ABN fabric is enumerated and checked to determine whether it is the boundary of the ABN fabric. A boundary is reached under one following conditions: (i) if a downward facing ABN bridge becomes a node bridge when it is connected to an endpoint within a switch or where a downward facing bridge is connected to PCIe PHY, then configuration of ABN node bridges is performed in step 1808; (ii) if a legacy Thunderbolt network is present where a downward facing bridge is connected to a non-ABN switch, then configuration of a legacy endpoint is performed in step 1810. At the conclusion of step 1806, the entirety of the ABN fabric has been assigned or allocated an ABN bus number.

For each ABN node bridge (step 1808), the enumeration software enumerates each endpoint of the ABN node bridge. In one exemplary embodiment, the ABN node bridge performs a modified version of the PCIe enumeration process, where the ABN bridge's ABN secondary bus number is copied into the bridge's ABN subordinate bus number. The enumeration process creates ABN configuration requests that target the node bus defined by the bridge's ABN secondary bus number register; in particular, the node enumeration software uses the ABN bus number while manipulating the PCIe triplet (i.e., bus number, device number, and function number) fields of the End-End TLP prefix. When these transactions are received by the node bridge, the configuration requests are converted to standard configuration transactions using the triplet values located in the TLP's prefix.

Node enumeration continues until all the endpoints attached to the node are located and configured. In one variant, while enumerating the endpoints of the node, the total number of functions each endpoint contains is tracked. The node format mode for the node bridge is set to the endpoint with the highest number of functions. In some variants, the number of functions located within any switches found in a given node also needs to be included in the determination of the highest number of functions.

For each legacy endpoint (step 1810), the endpoint is enumerated according to the legacy PCIe bus numbering schemes. In one embodiment, the ABN secondary bus number is copied into the ABN subordinate bus number. After each legacy endpoint has been assigned a bus number, the ABN phase of bus enumeration is complete. More directly, enumeration via step 1810 occurs via standard configuration transactions (not ABN transactions); in this manner, hybrid networks (supporting both legacy and ABN devices) can be supported.

Once all the ABN bus numbers have been either assigned or reserved by the system, legacy PCIe enumeration of the remaining non-ABN sections of the network resumes (step 1812). In one embodiment, the ABN enumeration software has previously stored the paths to bridges connected to non-ABN switches. Legacy PCIe enumeration is repeated at the ABN top bridge with the previously stored paths to non-ABN switches; however, now that the ABN fabric has been fully enumerated, standard PCIe routing resources is used (primary bus, secondary bus, subordinate bus, memory base/limit, and pre-fetchable base/limit). The enumeration software only traverses the ABN fabric along these paths and assigns bus numbers to the bridges along these paths. Once the non-ABN switches have been configured, legacy PCIe enumeration continues in a normal fashion for this section of the network.

Thereafter, the ABN secondary bus number register found in the ABN top bridge is set with a value larger than the highest used or reserved ABN bus number. In one such variant, this value is found by taking the highest ABN bus number value. For example, in one exemplary embodiment, the ABN secondary bus number register value is calculated by dividing the highest ABN bus number value by 4, and adding 1. In another such example, if the last ABN bus number in use is 0x257, then the first ABN top bridge's secondary bus number is 0x96 ((0x257/0x4)+0x1). Briefly, while the ABN format is 10 bits wide, it resides within 8 bits of the legacy PCIe number field. The two additional bits, when examined along with standard bus numbering, are always 0x0 and thus are can be ignored (i.e., are so-called "don't cares").

Figure 19:
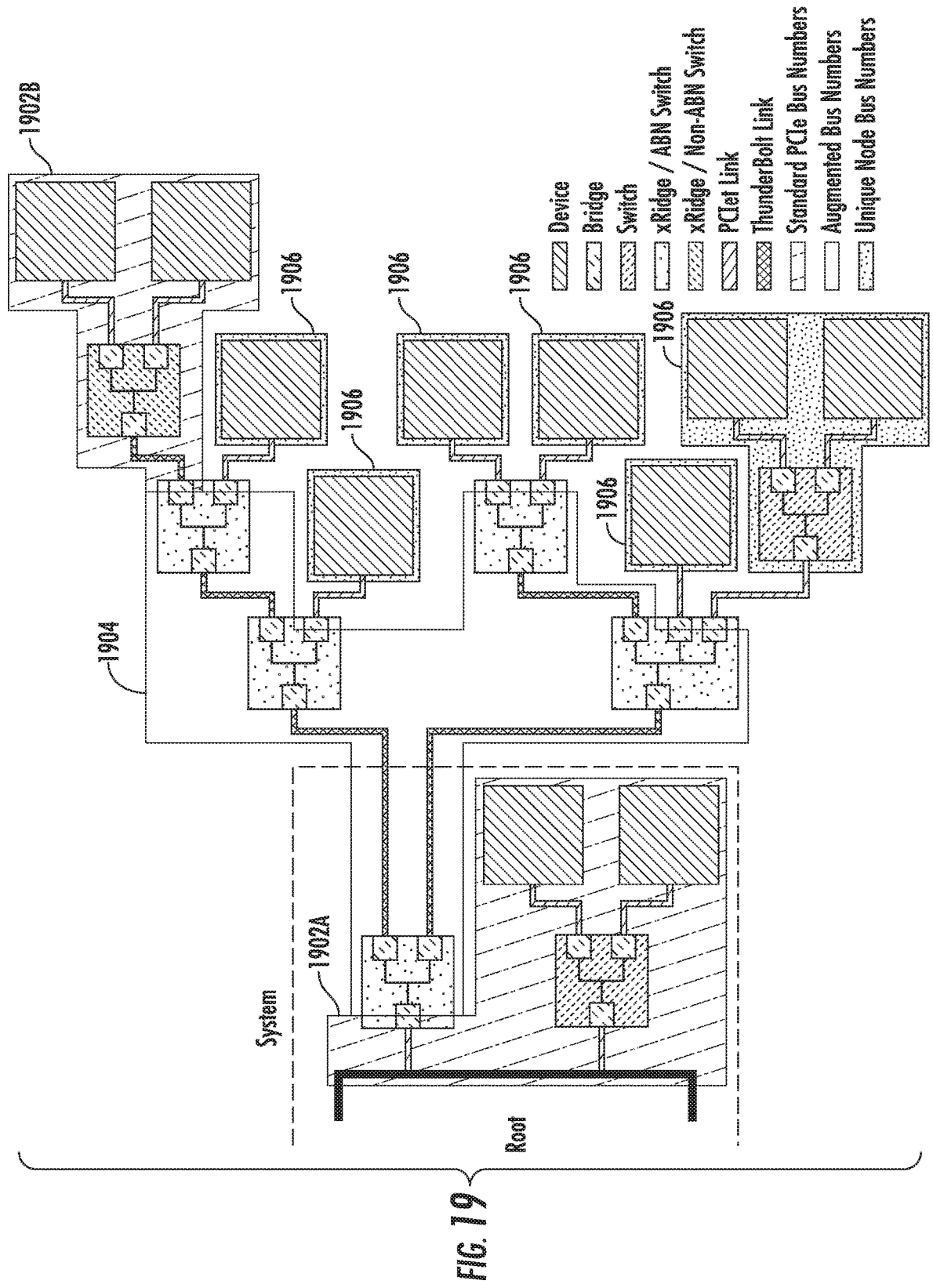
FIG. 19 is a logical representation of the resulting three different bus number regions resulting from an Augmented Bus Number (ABN) fabric enumeration process of a Thunderbolt network, in accordance with the exemplary method of FIG. 18.

FIG. 19 illustrates the resulting three different bus number regions resulting from an ABN fabric enumeration process of a Thunderbolt PCIe network 1900, in accordance with the method of FIG. 18. The first regions (1902A, 1902B) have bus numbers assigned to devices connected directly to the system's root complex (i.e., the first tier). As previously described, the method for enumerating devices under the first tier is halted to enable discovery of devices for the second region, and thereafter resumed. The second region 1904 has bus numbers assigned to ABN bridges which constitute the ABN fabric (i.e., the second tier). The last section 1906 is for bus numbers assigned to Thunderbolt PCIe devices (i.e., the third tier). More directly, those of ordinary skill in the related arts will appreciate, given the contents of the present disclosure, that the legacy bus numbering scheme does not affect ABN fabric routing because while ABN values can be larger than the legacy values, the entire ABN value is not used when compared to legacy routing resources. Consequently, at each routing decision point (e.g., ABN bridges, etc.), the legacy bus number exceeds the ABN range and will be ignored. For similar reasons, the ABN bus numbers are smaller than the legacy PCIe range checking, and will also be ignored.

Still further, unlike existing PCIe routing resources found on non-ABN bridges, ABN bridges contain multiple parallel range checking blocks. Parallel range checking blocks allow the enumeration software the flexibility to assign resources as needed. For example, traditional PCIe enumeration problems could occur if the user overloaded one of the branches (after the system has been initialized) with devices, since the enumeration software cannot respond by re-allocating unused resources (bus/device numbers and/or address ranges, etc.) to the branch in need. In contrast, the disclosed ABN enumeration software does not need to pre-allocate routing resources. Instead, enumeration software only assigns resources as needed. As the topology changes, resources can be either added or removed alongside resources that are already established. Also, resources can be assigned to any branch without the need for the newly added resource to be contiguous with other established resources contained in its branch. In other words, various aspects of the present disclosure do not require contiguous resource allocations.

Exemplary Apparatus—

Various embodiments of an apparatus configured to augment routing resources are now described in greater detail. As described herein, the exemplary apparatus is a consumer electronics device that includes one or more Thunderbolt interfaces and/or internal components, however those of ordinary skill in the related arts will readily appreciate that the various principles described herein may be readily implemented within other technologies and products.

Figure 20:
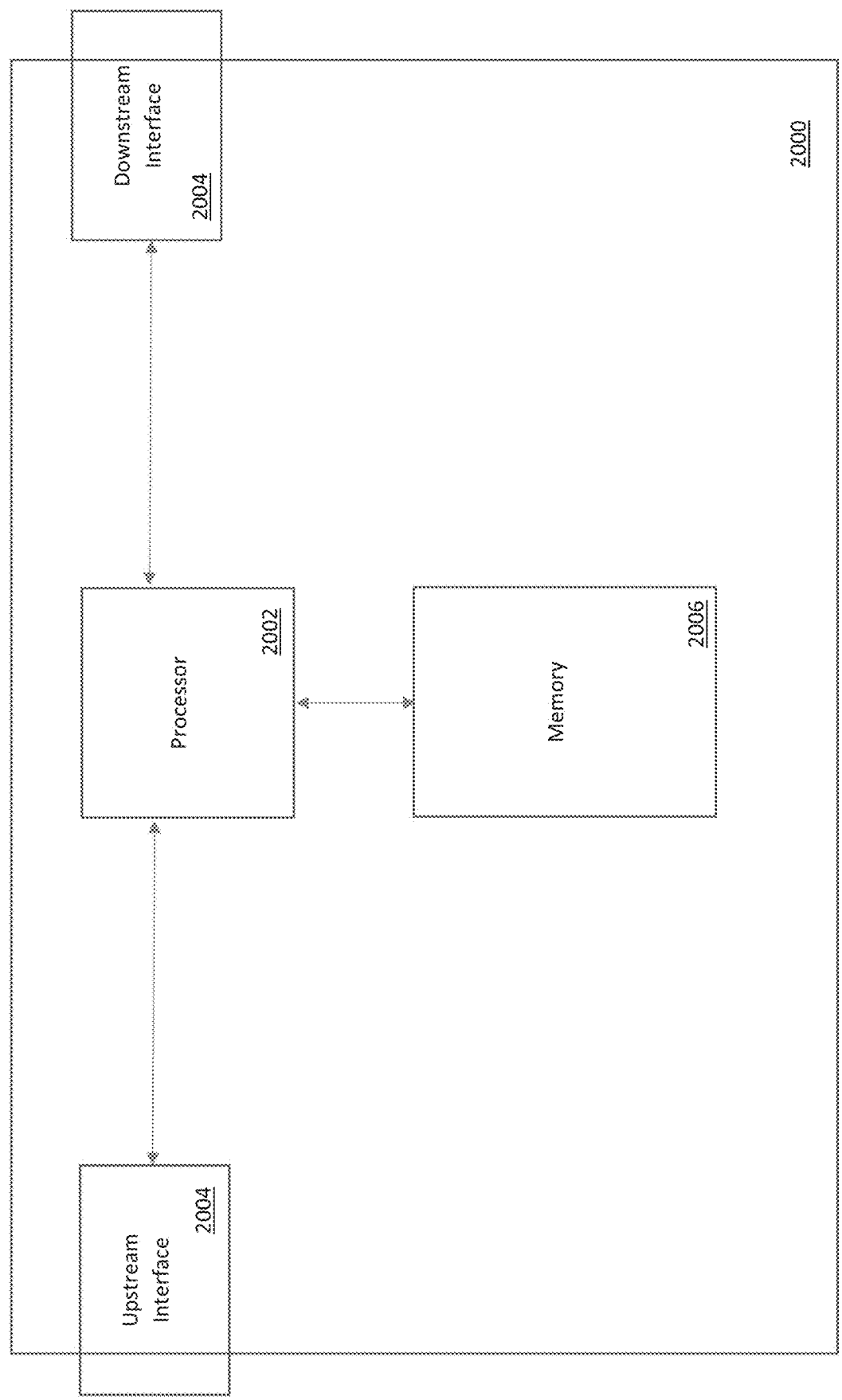
FIG. 20 illustrates one exemplary embodiment of consumer electronics apparatus useful in conjunction with the various principles described herein.

Referring now to FIG. 20, one exemplary embodiment of consumer electronics apparatus 2000 is depicted. As shown, the consumer electronics apparatus 2000 includes a host processor 2002 which is connected to one or more network interfaces 2004 (as shown, an upstream interface and a downstream interface). The host processor may additionally be coupled to a non-transitory computer readable medium 2006. In one embodiment, the non-transitory computer readable medium 2006 includes a plurality of instructions which when executed by the host processor 2002 are configured to implement a bus enumeration process with one or more devices connected as a network via the one or more network interfaces 2004. Some embodiments may additionally incorporate user input/output components including without limitation: displays, speakers, microphones, keyboards, pointing devices (e.g., mice, trackballs, etc.), remote controls, etc.

In one exemplary embodiment, the one or more network interfaces 2004 include a Thunderbolt interface that transacts data via a Peripheral Connect Interface Express (PCIe) interface and/or a DisplayPort interface. Other common examples of network interfaces include, without limitation, Peripheral Component Interface (PCI), PCI-Express (PCIe), PCI-eXtended (PCI-X), FireWire, DisplayPort, Universal Serial Bus (USB), High Definition Multimedia Interface (HDMI), etc. More generally, those of ordinary skill in the related arts will readily appreciate that the various aspects of the present disclosure are useful for virtually any PCI/PCIe based network technology suitable for transacting data via a fixed set of network resources. In some variants, the fixed set of network resources may be a limitation on routing resources (e.g., addressable range, channels, frequencies, time slots, frames, codes, etc.)

In some embodiments, the one or more network interfaces 2004 include a root complex which is the ingress/egress for all transactions between a host of the network and its connected devices via a network. In other embodiments, the one or more network interfaces 2004 include an endpoint which is the ingress/egress for all transactions between the device of the network and its host. In some network technologies, various ones of the devices may additionally communicate with other devices. In still other network technologies, the devices may only communicate with the host. In such technologies, device-to-device communications are communicated from a first device to the host for routing to the destination device(s). It will be appreciated that not all elements are required for operation within an apparatus. For instance, a host apparatus would not require upstream ports; similarly, an endpoint node would not require downstream ports or a root complex.

For embodiments which incorporate multiple network interfaces 2004, various ones of the network interfaces may be upstream interfaces and downstream interfaces. In certain embodiments, the upstream and downstream interfaces may be further connected via an internal bus. In other embodiments, the upstream and downstream interfaces may be switch-ably connected. In still other embodiments, the upstream and downstream interfaces may be connected via hub or repeater type configurations. Some bridge variants may additionally implement various network management capabilities to reduce in network congestion. These capabilities may include, without limitation: quality of service (QoS) guarantees, flow control, error checking/correction, automatic repeat request (ARQ), etc.

In one exemplary embodiment of the present disclosure, a bridge device may modify the transactions during routing so as to augment a fixed pool of routing resources. In one exemplary embodiment, the bridge is a so-called top bridge which is configured to convert transactions of a first legacy format to a second augmented format. In another exemplary embodiment, the bridge is a so-called node bridge which is configured to convert transactions from the second augmented format to the first legacy format. In one embodiment, the augmented format is modified in a manner which is distinguishable from the legacy format, thereby enabling detection by other devices. In some embodiments, the augmented format is invalid under legacy protocols, and is ignored by legacy devices.

In one exemplary embodiment, the non-transitory computer readable medium 2008 includes one or more memory components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

In one exemplary embodiment, the non-transitory computer readable medium is configured to enable the processor to convert a type 1 configuration request to a type 0 configuration request. In one such variant, the conversion occurs at the node bridge. In some variants, a device that receives a type 0 configuration request will infer that the type 0 configuration request is intended for it, and updates its bus/device number fields to the values in the configuration request. In a related variant, the apparatus connecting a root complex to one or more intermediary bridges is configured to convert a legacy type 1 configuration request to an augmented type 1 configuration request. In one such variant, the conversion occurs at the top bridge.

In one exemplary embodiment, the non-transitory computer readable medium is configured to enable the processor to determine whether a transaction is in an augmented bus format or a legacy bus format. In some embodiments, the determination is based on a format of the transaction. For example, in one exemplary case, an augmented transaction is identified based on the presence of a prefix. In other implementations, an augmented transaction is identified based on the contents of a field (e.g., a type or format field, etc.), and/or specialized signaling (e.g., dedicated hardware, etc.)

In one exemplary embodiment, the non-transitory computer readable medium is configured to enable the processor to reformat a legacy format transaction to an augmented bus format and/or vice versa. In one exemplary embodiment of the present disclosure, the transaction is reformatted based on the destination address of the transaction; in other embodiments, the transaction is configured to be reformatted based on neighboring device considerations. In one such embodiment, the transaction is reformatted to a legacy format based on the limitations of the upstream devices of the network. In another embodiment, the transaction is configured to be reformatted to a legacy format based on the limitations of the downstream devices of the network.

In some embodiments, the reformatting includes adding or removing one or more fields of the transaction. In some cases, the reformatting may additionally include adding or removing a prefix and/or postfix of the transaction. Common examples of reformatting include without limitation: modifying the contents of a field, adding/removing fields, swapping the contents of a field, padding/pruning the contents of a field, etc. In one exemplary case, the reformatting includes replacing a field containing a triplet of a bus number, device number, and function number, with the contents of an augmented bus number. In another exemplary case, the reformatting includes replacing a reserved field with the contents of an augmented bus number or a legacy triplet.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for augmenting routing resources at a bridge device, comprising: recognizing a default bus type transaction based on a default bus type identifier; responsive to an attachment of one or more subordinate buses, assigning respective one or more subordinate bus type identifiers; for each subsequent transaction that is identified with a destination subordinate bus type identifier, forwarding the subsequent transaction to a corresponding subordinate bus; and responsive to a change in topology of the attached one or more subordinate buses, reassigning one or more different subordinate bus type identifiers to respective one or more of the attached one or more subordinate buses, the reassigning occurring during operation of the attached one or more subordinate buses without affecting the default bus type identifier, the reassigning of the one or more different subordinate bus type identifiers enabling allocation of non-contiguous subordinate bus type identifiers.

2. The method of claim 1, wherein the default bus type transaction comprises a Peripheral Component Interconnect Express (PCIe) transaction, and the default bus type identifier comprises assigning a triplet that comprises a bus number, a device number, and a function number.

3. The method of claim 1, wherein assigning subordinate bus type transactions comprise assigning both a destination subordinate bus type identifier, and a destination node identifier.

4. The method of claim 1, wherein for each subsequent transaction that is identified with a destination subordinate bus type identifier that matches a subordinate bus identifier associated with a target device below the bridge device, converting the transaction to a default bus transaction for the target device.

5. The method of claim 1, wherein a portion of the subsequent transactions are non-posted transactions.

6. The method of claim 5, further comprising for each non-posted transaction received from another device: recording an original request identifier and assigning a unique tag value to the transaction; responsive to receiving a completion identified with the unique tag value, replacing the unique tag value with the original request identifier; and forwarding the completion to the another device.

7. The method of claim 1, further comprising operating the bridge device as a top bridge of an augmented bus capable network.

8. The method of claim 1, further comprising operating the bridge device as a node of an augmented bus capable network.

9. The method of claim 1, wherein the attachment of one or more subordinate buses comprises attaching as a hot plug event.

10. The method of claim 1, wherein at least one of the reassigned one or more subordinate bus type identifiers is not contiguous with at least one other one of the reassigned one or more subordinate bus type identifiers.

11. A bridging apparatus configured to augment routing resources, comprising: an upstream interface; one or more downstream interfaces; and a bridge device that: (i) recognizes a default bus type transaction based on a default bus type identifier, the default bus type identifier being associated with a first target device configured to operate according to the default bus type transaction; (ii) responsive to an attachment of one or more subordinate buses, assigns one or more subordinate bus type identifiers, the attachment of the one or more subordinate buses comprising a change in network topology, the assignment of the one or more subordinate bus type identifiers comprising a dynamic reallocation of bus numbers during operation of the bridging apparatus, the dynamic reallocation of bus numbers comprising an allocation of different respective bus numbers to the attached one or more subordinate buses during operation of the attached one or more subordinate buses based on the change in network topology, the allocation of different respective bus numbers comprising enabling an allocation of non-contiguous bus numbers, some of the bus numbers comprising an augmented bus value that excludes the default bus type identifier; and (iii) for each subsequent transaction that is identified with a destination subordinate bus type identifier, forwards the subsequent transaction to another target device that is physically separate from the first target device, the other target device being configured to operate by the default bus type transaction via the corresponding subordinate bus.

12. The bridging apparatus of claim 11, further comprising a node bridge that, responsive to receiving a transaction that is identified with a destination subordinate bus type identifier that matches a subordinate bus identifier associated with the other target device below the bridging apparatus, converts the transaction to a default bus transaction.

13. The bridging apparatus of claim 12, wherein the default bus type transactions are selected from the group consisting of default type 0 transactions and default type 1 transactions.

14. The bridging apparatus of claim 12, wherein the forwarded subsequent transaction comprises an augmented bus type transaction.

15. The bridging apparatus of claim 14, wherein the augmented bus type transactions are selected from the group consisting of augmented type 0 transactions and augmented type 1 transactions; wherein the augmented type 0 transactions are forwarded directly to the first target device; and wherein the augmented type 1 transactions are forwarded to the node bridge in data communication with the first target device.

16. The bridging apparatus of claim 15, further comprising the node bridge that, for subsequent transactions that correspond to a target bridging apparatus below the bridging apparatus, converts the subsequent transactions to an augmented type 0 transaction.

17. The bridging apparatus of claim 11, where the bridging apparatus further comprises a node coupled to a plurality of endpoint devices.

18. The bridging apparatus of claim 11, where the bridging apparatus further comprises a top bridge coupled to a plurality of augmented bridge devices.

19. The bridging apparatus of claim 11, wherein at least one of the bus numbers is not contiguous with one or more other ones of the allocated different respective bus numbers.

\* \* \* \* \*